United States Patent
Toyoda et al.

(10) Patent No.: US 7,520,832 B2
(45) Date of Patent: Apr. 21, 2009

(54) CONTINUOUSLY VARIABLE TRANSMISSION SYSTEM

(75) Inventors: Toshiro Toyoda, Kanagawa (JP); Eiji Inoue, Kanagawa (JP); Takashi Imanishi, Kanagawa (JP); Takumi Sinojima, Kanagawa (JP)

(73) Assignee: NSK Ltd., Tokyo (JP)

( * ) Notice: Subject to any disclaimer, the term of this patent is extended or adjusted under 35 U.S.C. 154(b) by 287 days.

(21) Appl. No.: 11/434,244

(22) Filed: May 16, 2006

(65) Prior Publication Data

US 2006/0264295 A1 Nov. 23, 2006

(30) Foreign Application Priority Data

May 17, 2005 (JP) ............... P.2005-143583
Jul. 29, 2005 (JP) ............... P.2005-220581

(51) Int. Cl.
*F16H 37/02* (2006.01)
(52) U.S. Cl. .............. 475/209; 475/208; 475/214; 477/38; 477/41
(58) Field of Classification Search .......... 477/37, 477/38, 41; 475/207, 208, 209, 214, 216, 475/217
See application file for complete search history.

(56) References Cited

U.S. PATENT DOCUMENTS 6,663,532 B1 12/2003 McIndoe et al.
6,830,533 B2 * 12/2004 Inoue et al. ............ 477/37

2004/0092359 A1 * 5/2004 Imanishi et al. ............ 476/10
2005/0037887 A1 * 2/2005 Shinojima et al. .......... 475/214

FOREIGN PATENT DOCUMENTS

| JP | 2001-317601 A | 11/2001 |
| JP | 2002-89669 A | 3/2002 |
| JP | 3460676 B2 | 8/2003 |
| JP | 2003-307266 A | 10/2003 |
| JP | 2004-225888 A | 8/2004 |
| JP | 2004-308853 A | 11/2004 |

OTHER PUBLICATIONS

Best Car Supplement Volume "Red Badge Series 245/Book Presenting Automotive Latest Mechanisms", pp. 92-93, by Motoo Aoyama, published by KK San Yuh Sha/KK Kadansha, on Dec. 20, 2001.
"Toroidal CVT" by Hirohisa Tanaka, published by KK Corona on Jul. 13, 2000.

* cited by examiner

*Primary Examiner*—David D. Le
(74) *Attorney, Agent, or Firm*—Sughrue Mion, PLLC

(57) ABSTRACT

A sleeve 28 making up a gear ratio control valve 21 is driven by not only a stepping motor 29 but also a secondary actuator 47. Pressure oil is made free to be introduced into the secondary actuator 47 through a manual oil pressure switching valve 37 which is switched over by a gearshift. Then, when the gearshift is operated from a non-running state to a running state, a gear ratio of a toroidal type continuously variable transmission is corrected by a predetermined amount by driving the sleeve 28 by the secondary actuator 47. As a result, while improving characteristic of a vehicle when starting from rest, the vehicle can be prevented from being reduced in speed unintentionally excessively even when the gearshift is operated while running.

30 Claims, 16 Drawing Sheets

TORQUE SHIFT CHARACTERISTICS

P · N · D · L RANGE → WHEN IN R RANGE
α → MOVE TO β
R RANGE → WHEN IN P · N · D · L RANGE
β → MOVE TO α

CONTINUOUSLY VARIABLE TRANSMISSION SYSTEM

BACKGROUND OF THE-INVENTION

1. Field of the Invention

The present invention relates to an improved continuously variable transmission system which incorporates therein a toroidal type continuously variable transmission in addition to a gearwheel type transmission (such as using a planetary gear mechanism) for use as a vehicular automatic transmission. The present invention improves the characteristics of a vehicle at a start thereof, as well as prevent an excessive reduction in speed of the vehicle even though a gearshift is operated while running.

2. Description of the Background Art

It is known that toroidal type continuously variable transmissions which are used as automotive automatic transmissions are described in many publications including 1) Japanese Patent Unexamined Publication JP-A-2001-317601, 2) "Best Car Supplement Volume entitled Red Badge Series 245/Book Presenting Automotive Latest Mechanisms" pp. 92-93 written by Motoo Aoyama, and published by Kabushiki Kaisha San Yuh Sha/Kabushiki Kaisha Kodansha, on Dec. 20, 2001, and 3) "Toroidal CVT" written by Hirohisa Tanaka and published by Kabushiki Kaisha Corona on Jul. 13, 2000 and the like and some of them are actually put in practical use. A toroidal type continuously variable transmission like this includes an input disk and an output disk of which respective facing axial side surfaces are made into a toroidal surface and which are supported concentrically with each other in a relatively rotatable fashion and a plurality of power rollers which are held between the input side and output disks. When in operation, the rotation of the input disk is transmitted to the output disk via the individual power rollers. The power rollers are rotatably supported on support members such as trunnions, respectively. The support members are supported in such a manner as to freely swing to be displaced about pivot shafts, respectively, which are situated at positions turned relative to a center axis of both the disks. When attempting to change a gear ratio between the disks, the support members are displaced in an axial direction of the pivot shafts by means of an hydraulic actuator, respectively. The supply and discharge of pressure oil to and from the actuator like this is controlled by a gear ratio control valve, and the movement of the support members is fed back to the gear ratio control valve.

When the support members are displaced in the axial direction of the pivot shafts based on the supply and discharge of pressure oil to and from the actuator, the direction of a tangential force acting on a rolling contact portion (a traction portion) between respective circumferential surfaces of the power rollers and the respective side surfaces of the input side and output disks is changed (a side lip is generated on the rolling contact portion). Then, the individual support members swing (tilt) about the corresponding pivot shafts in association with the change of the direction of the force. Contact positions are changed accordingly where the circumferential surfaces of the power rollers and the side surfaces of the input side and output disks are in contact with each other. When the circumferential surfaces of the power rollers are brought into rolling contact with a portion on the side surface of the input disk which lies radially further outwards and a portion on the side surface of the output disk which lies radially further inwards, the gear ratio between the two disks is changed to a speed increasing side. In contrast to this, when the circumferential surfaces of the power rollers are brought into rolling contact with a portion on the side surface of the input disk which lies radially further inwards and a portion on the side surface of the output disk which lies radially further outwards, the gear ratio between the two disks is changed to a speed decreasing side.

In addition, when the toroidal continuously variable transmission that has been described above is attempted to be installed in an actual vehicular automatic transmission, there has been conventionally proposed a configuration in which the toroidal type continuously variable transmission is combined with a gearwheel type differential unit using a planetary gear mechanism or the like to make up a continuously variable transmission system. For example, Japanese Patent Unexamined Publications No.JP-A-2003-307266 describes a continuously variable transmission system utilizing a so-called Geared Neutral (GN) construction in which with an input shaft kept rotating in one direction, the rotating state of an output shaft can be switched between forward rotation and reverse rotation across a stationary state. In the case of the continuously variable transmission system like this, a torque which passes through the toroidal type continuously variable transmission needs to be controlled in such a state that the output shaft is stopped or is allowed to rotate at extremely low speed with the input shaft kept rotating. In view of this situation, Japanese Patent Unexamined Publication No.JP-A-2004-225888 describes a control method for controlling the torque that passes through the toroidal type continuously variable transmission (which is called as through torque) to a target value by, while roughly controlling the rotational speed of an engine which drives the input shaft, adjusting the gear ratio of the toroidal type continuously variable transmission in accordance with the rotational speed of the so controlled engine.

In addition, it is described in the JP-A-2004-225888 that the gear ratio of the toroidal type continuously variable transmission is adjusted (corrected) so that a torque (a driving force, a creeping force), which somehow enables a vehicle to start from a rest state and run at low speed in a traveling direction, can be transmitted to the output shaft in such a state that the output shaft is stopped with the input shaft kept rotating (an infinite gear ratio state of the continuously variable transmission system=a GN state of the toroidal type continuously variable transmission). To describe specifically, it is described that for an example, when the gearshift is shifted from a non-running state such as a P range (a parking position) or an N range (a neutral position) to a running state such as a D range (a normal forward position), an L range (a forward position with high driving force) or an R range (a reverse position) with the vehicle stopped, the gear ratio of the toroidal type continuously variable transmission is adjusted so that a torque that is outputted from the continuously variable transmission system (a torque that is transmitted to the output shaft) becomes a predetermined value which corresponds to the respective positions (D, L, R) to which the gearshift is shifted (for example, a value at which a torque is obtained which somehow enables the vehicle to start from rest and run at low speed in the traveling direction) on a condition where the depression of the brake pedal is released.

Additionally, Japanese Patent Unexamined Publication No. JP-A-2004-308853 describes an invention relating to a continuously variable transmission which can strictly control a gear ratio of a toroidal type continuously variable transmission so that a torque applied to an output shaft becomes nil or is reduced to a small value. FIGS. 15 to 16 show the continuously variable transmission system described in the JP-A-2004-308853. FIG. 15 shows a block diagram of the continuously variable transmission system. In FIG. 15, a thick arrow denotes a power transmission path, a solid line denotes a hydraulic circuit, and a broken line denotes an electric circuit. An output from an engine 1 is inputted into an input shaft 2 via a damper 2. Power transmitted to the input shaft 3 is transmitted from a hydraulic pressurizing device 5, which makes up a toroidal type continuously variable transmission 4, to an input disk 6 and the power is further transmitted to an output disk 8 via power rollers 7.

In the two disks 6, 8, the rotational speed of the input disk 6 is measured by an input side rotation sensor 9, whereas the rotational speed of the output disk 8 is measured by an output side rotation sensor 10. Respective measured speeds are inputted into a control unit 11 for calculation of a gear ratio (a speed ratio) between the two disks 6, 8 (a gear ratio of the toroidal type continuously variable transmission 4). In addition, the power transmitted to the input shaft 3 is transmitted to a planetary gear type transmission 12, which is a differential unit, directly or via the toroidal type continuously variable transmission 4. Then, a differential component of constituent members of the planetary gear type transmission 12 is taken out to an output shaft 14 via a clutch device 13. This clutch device 13 represents a low-speed clutch 15 and a high-speed clutch 16 shown in FIG. 16 which will be described later on. In addition, an output shaft rotation sensor 17 is able to detect the rotational speed of the output shaft 14.

On the other hand, an oil pump 18 (18a, 18b in FIG. 16) is driven by power taken out from the damper 2 portion, and pressure oil discharged from the oil pump 18 is free to be sent into the pressurizing device 5 and a control valve unit 20 for controlling a displacement amount of an actuator 19 (refer to FIG. 16) for displacing trunnions, which are support members for supporting the power rollers 7 in an axial direction of pivot shafts (not shown). Note that this control valve unit 20 is made up of a combination of a gear ratio control valve 21, a differential pressure cylinder 22, correcting control valves 23a, 23b, a high-speed switching valve 24 and a low-speed switching valve 25 which are shown in FIG. 16 for a subsequent description. In these constituent members, the gear ratio control valve 21 controls the supply and discharge of pressure oil to and from the actuator 19. In addition, oil pressures in a pair of hydraulic chambers 26a, 26b (refer to FIG. 16) provided in the actuator 19 are detected by an oil pressure sensor 27 (actually, a pair of oil pressure sensors 27a, 27b as shown in FIG. 16), and detection signals are inputted into the control unit 11.

The control unit 11 calculates a torque that passes through the toroidal type continuously variable transmission 4 (the through torque) based on signals from the oil pressure sensor 27. Then, in order to correct the gear ratio of the toroidal type continuously variable transmission 4 according to the so calculated through torque, a sleeve 28 (refer to FIG. 16) which is a constituent member of the gear ratio control valve 21 is displaced by the differential pressure cylinder 22. The supply and discharge of pressure oil to and from the differential pressure cylinder 22 like this is controlled by the correcting control valves 23a, 23b. In addition, the operating state of the control valve unit 20 is switched by a stepping motor 29, a line pressure control solenoid switch valve 30, a solenoid valve 31 for switching the correcting control valves 23a, 23b and a shifting solenoid valve 32 for switching the high-speed switching valve 24 and the low-speed switching valve 25. In addition, any of the stepping motor 29, the line pressure control solenoid switch valve 30, the solenoid valve 31 and the shifting solenoid valve 32 is switched based on a control signal from the control unit 11.

In addition to signals from the individual rotation sensors 9, 10, 17 and the oil pressure sensor 27, a detection signal from an oil temperature sensor 33, a position signal from a position switch 34, a detection signal from an accelerator sensor 35 and a detection signal from a brake switch 36 are inputted into the control unit 11. Among the sensors, the oil temperature sensor 33 detects temperature of lubricating oil (traction oil) which resides within a casing which accommodates therein the continuously variable transmission system. The position switch 34 generates a signal representing an operation position (a selected position) to which a gearshift (an operation lever), which is provided in the vicinity of a driver's seat, is operated for switching a manual oil pressure switching valve 37 shown in FIG. 16, which will be described later on. Additionally, the accelerator sensor 35 detects the opening of an accelerator pedal. Furthermore, the brake switch 36 detects the depression of the brake pedal or the operation of a parking brake and generate a signal which signals the detected fact.

In addition, based on signals from the individual switches 34, 36 and individual sensors 9, 10, 17, 27, 33, 35, the control unit 11 sends the control signals to the stepping motor 29, the line pressure control solenoid switch valve 30, the solenoid valve 31 and the shifting solenoid valve 32 and additionally sends a control signal to an engine controller 38 for controlling the engine 1. Then, as is described in the JP-A-2004-225888, the control unit 11 changes the speed ratio between the input shaft 1 and the output shaft 14, or the control unit 11 controls the torque (the through torque) that passes through the toroidal type continuously variable transmission 4 applied to the output shaft 14 while the vehicle is stopped or runs at extremely low speed. Furthermore, in a case where the JP-A-2004-308853 describes, a rotational speed and rotational direction of the output shaft 14 are calculated for controlling the through torque.

FIG. 16 shows the hydraulic circuit controlling the continuously variable transmission system as described above. In this hydraulic circuit, pressure oil, which is sucked from an oil reservoir 39 to be discharged by the oil pumps 18a, 18b, is made free to be adjusted to a predetermined pressure by means of pressure regulator valves 40a, 40b. In these pressure regulator valves 40a, 40b, pressure regulated by the pressure regulator valve 40a for regulating an oil pressure sent to the manual oil pressure switching valve 37 side is made free to be regulated based on the opening or closing of the line pressure control solenoid switch valve 30. Then, pressure oil whose pressure is regulated by both the pressure regulator valves 40a, 40b is made free to be sent into the actuator 19 via the gear ratio control valve 21 and is also made free to be sent into the correcting control valves 23a, 23b for adjusting the stroke of the differential pressure cylinder 22 based on the opening or closing of the solenoid valve 31. In addition, the pressure oil is also made to be sent into the hydraulic pressurizing device 5.

In addition, this pressure oil is made free to be sent into the hydraulic chamber of the low-speed clutch 15 or the high-speed clutch 16 via the manual oil pressure switching valve 37 and the high-speed switching valve 24 of the low-speed switching valve 25. Additionally, in these low-speed clutch 15 and the high-speed clutch 16, the low-speed clutch 15 is engaged when realizing a low-speed mode in which a reduction ratio is increased (including an infinite gear ratio) and is disengaged when realizing a high-speed mode in which the reduction ratio is decreased. In contrast to this, the high-speed clutch 16 is disengaged when realizing the low-speed mode and is engaged when realizing the high-speed mode. In addition, the supply and discharge of pressure oil to and from these low-speed and high-speed clutches 15, 16 is selected according to the switching state of the shifting solenoid valve 32.

In the case of the invention described in the JP-A-2004-308853, the rotational speed and rotational direction of the output shaft 14 are calculated based on the detection signals of the input side rotation sensor 9 and output side rotation sensor 10 in the manner described above, so as to control the through torque of the toroidal type continuously variable transmission 4. Accordingly, the gear ratio of the toroidal type continuously variable transmission can be strictly controlled so that the torque applied to the output shaft becomes nil or falls to a small value in the non-running state. In addition, even when the gearshift is operated from the non-running state to the running state, the predetermined driving force (the driving force which somehow enables the vehicle to start from a rest state and run at low speed in the traveling direction) is made to be outputted from the output shaft.

In addition, Japanese Patent Examined Publication JF-B-3460676 describes an invention which prevents the occurrence of a case where when a gearshift is operated from a non-running state to a running state, a predetermined torque cannot be outputted from an output shaft of a continuously variable transmission system based on a torque shift. Namely, in an event that a torque that passes through a toroidal type continuously variable transmission which makes up the continuously variable transmission system fluctuates in such a state that a gear ratio of the toroidal type continuously variable transmission is adjusted to the vicinity of a value (a GN value) at which a state can be realized where an output shaft is stopped with an input shaft kept rotating, a torque shift where the gear ratio of the toroidal type continuously variable transmission fluctuates is generated due to inevitable elastic deformation of individual constituent members and/or assembling clearance. Then, when the torque shift like this occurs, even in the event that a stepping motor for changing the switching state of a gear ratio control valve for controlling the gear ratio of the toroidal type continuously variable transmission is driven to a predetermined position such as a position where the state can be realized in which the output shaft is stopped with the input shaft kept rotating (a position where a GN state can be realized), there occurs a possibility that the gear ratio of the toroidal type continuously variable transmission is caused to deviate from a gear ratio which corresponds to the position of the gearshift is operated.

When there occurs such a deviation in the gear ratio of the toroidal type continuously variable transmission, there occurs a possibility that the output shaft cannot be stopped or a predetermined driving force cannot be outputted from the output shaft. In order to prevent the occurrence of such inconvenience, in the case of the invention described in the JP-B-3460676, when the gearshift is operated from the non-running state to the running state, after the stepping motor has been temporarily driven in a predetermined direction (a direction in which it is separated away from the position where the GN state can be realized) which corresponds to a position to which the gearshift is operated (the running state), the stepping motor is driven to the predetermined position where the GN state can be realized. As a result, irrespective of the occurrence of the aforesaid shift torque, the gear ratio of the toroidal type continuously variable transmission can be accurately adjusted to a desired value, so that the output shaft can be stopped, or the predetermined driving force can be outputted from the output shaft.

Additionally, Japanese Patent Unexamined Publication No.JP-A-2002-89669 describes an invention which prevents the occurrence of a halt of an engine when a gearshift is operated from a non-running state to a running state whether or not a brake pedal is depressed. Namely, when the gearshift is operated from the non-running state to the running state, in an event that a gear ratio of a toroidal type continuously variable transmission is simply attempted to be adjusted to a value at which a driving force in a traveling direction can be outputted from an output shaft in such a state that the brake pedal is depressed, depending upon the magnitude of the driving force so outputted, an excessive load is applied to the engine, leading to a possibility that the engine is stopped. In order to prevent the occurrence of such inconvenience, in the case of the invention described in the JP-A-2002-89669, when the gearshift is operated from the non-running state to the running state, a stepping motor for changing the switching state of a gear ratio control valve for controlling the gear ratio of the toroidal type continuously variable transmission is driven as will be described below.

Namely, the stepping motor is driven within a range where the gear ratio of the toroidal type continuously variable transmission can fall to a value at which the gear ratio can become the GN value based on the torque shift without stopping the engine and in such a manner that the gear ratio can become a value at which a necessary driving force in the traveling direction can be outputted from the output shaft. As a result, a state can be realized where when the gearshift is operated from the non-running state to the running state, even with the brake pedal depressed, the output shaft can be stopped with the input shaft kept rotating in one direction due to the gear ratio being changed to the GN value based on the toque shift. In addition, in association with this, irrespective of the fact that a load based on the torque shift is applied to the engine, the engine can be prevented from being stopped. In addition, the depression of the brake pedal is released from the state where the output shaft is stopped based on the depression of the brake pedal like this, the vehicle can be started in a smooth fashion.

Incidentally, in the case of the inventions that are described in the JP-B-3460676 and JP-A-2002-89669, respectively, the following points are not taken into consideration. Namely, in the case of the inventions described in the JP-B-3460676 and JP-A-2002-89669, when the gearshift is operated from the non-running state to the running state, even though the gear ratio of the toroidal type continuously variable transmission is adjusted (corrected) to the predetermined value by driving the stepping motor in the way described above, there exists a possibility that the clutch device for switching the power transmitting state is engaged before the gear ratio has reached (has been corrected completely) to the predetermined value. As this may occur, the vehicle is likely to exhibit a behavior that the driver does not intend, which is not preferable. For example, when the driver attempts to shift the gearshift from the non-running state to the running state to start the vehicle in a selected direction immediately, a torque in the intended direction cannot be outputted from the output shaft, leading to a possibility that the driver cannot start the vehicle from rest in the intended direction. In addition, when the gearshift is operated, for example, from the D range to the R range without depressing the brake pedal, there exists a possibility that the vehicle moves forwards even momentarily irrespective of the gearshift being shifted into the R range.

In addition, in the case of the inventions described in the JP-B-3460676 and the JP-A-2002-89669, the operation of the gearshift is detected by a gear selection position detecting device (JP-B-3460676) or a start selection detecting device (JP-A-2002-89669), so that the adjustment of the gear ratio is effected in the way described above based on the detection. Thus, when the adjustment of the gear ratio is carried out after the operation of the gearshift has been detected by the detection devices, there is a possibility that a slippage on timing (a delay in operation) occurs between the gearshift operating timing and a driving timing at which the driving member such as the stepping motor is driven to adjust the gear ratio to the desired value based on the detection by the detection devices. The slippage on timing like this may constitute a cause for a risk where the vehicle behaves in a way that the driver does not intend, which is not preferable to occur.

In addition, in the event of the inventions described the JP-B-3460676 and the JP-A-2002-89669, whenever the gearshift is operated from the non-running state to the running state, the gear ratio is considered to be adjusted to the GN value or the value at which the predetermined driving force can be outputted from the output shaft. Due to this, in the event that the gearshift is shifted to the non-running state (N range) due to an erroneous operation of the gearshift by the driver or an intended one with a view to improving the fuel economy while the vehicle is running and is then shifted back to the non-running state to the running state (D range), there exists a possibility that the gear ratio is adjusted to the GN value or the value at which the predetermined driving force is outputted from the output shaft. As this may occur, the vehicle is likely to be reduced in speed unintentionally excessively, making the driver feel a sensation of physical disorder, which is not preferable to occur.

Additionally, U.S. Pat. No. 6,663,532 describes an invention which controls a torque that passes through a toroidal type continuously variable transmission when a vehicle is started from a rest state. In the case of the invention described in the U.S. Pat. No. 6,663,532, however, until power (torque) is inputted into the toroidal type continuously variable transmission through engagement of a clutch device, the torque that passes through the toroidal type continuously variable transmission cannot be adjusted to a target value which is a value at which a driving force in a traveling direction can be outputted from an output shaft. In other words, there exists a possibility that the clutch device is engaged before the torque that passes through the toroidal type continuously variable transmission is adjusted to the target value so that the clutch device is allowed to transmit power. Due to this, as has been described above, there exists a possibility that the vehicle behaves in the way that the driver does not intend, which is not preferable to occur.

SUMMARY OF THE INVENTION

The invention was made in view of the situations and an object thereof is to realize a construction which can improve characteristics when a vehicle starts from a rest state and also prevent that the vehicle is reduced in speed unintentionally excessively even when a gearshift is operated while the vehicle is running.

With a view to accomplishing the object, according to a first aspect of the invention, there is provided a continuously variable transmission system comprising:

a toroidal type continuously variable transmission comprising:
   at least a pair of disks supported concentrically with each other in a relatively rotatable fashion;
   a plurality of power rollers held between the pair of disks;
   a plurality of support members rotatably supporting the plurality of power rollers, respectively; and
   a hydraulic actuator displacing the support members individually so as to change a gear ratio between the pair of disks;

a gearwheel type differential unit comprising a plurality of gearwheels which are engaged each other; and a clutch device which freely connects and disconnects a power transmission path of the continuously variable transmission system, wherein rotary states of an output shaft are freely changed between forward rotation and reverse rotation across a stationary state with an input shaft kept rotating in one direction by a drive source, such the rotary states of the output shaft are obtained by adjusting the gear ratio of the toroidal type continuously variable transmission to change a relative displacement speed of the respective gearwheels of the differential unit, and wherein when a gearshift is operated from a non-running state to a running state, the gear ratio of the toroidal type continuously variable transmission is corrected by a predetermined amount, before the clutch device connecting the power transmission path transmits power in accordance with an operation of the gearshift.

According to the continuously variable transmission system described in the first aspect of the invention, the characteristics when the vehicle starts from the rest state can be improved. Namely, when the gearshift is operated from the non-running state to the running state, the gear ratio of the toroidal type continuously variable transmission is corrected by the predetermined amount before the clutch device is made ready for transmission of power. In addition, by controlling the predetermined amount (correction amount) by which the toroidal type continuously variable transmission is corrected, the driving force (driving torque) that is outputted from the output shaft can be controlled to a desired value (for example, a similar value or the like which equals a creeping force that is outputted in a conventional automatic transmission). Due to this, the vehicle can be stopped in an ensured fashion or started from the rest state in a direction intended by the driver in a smooth fashion in a state that the clutch device is engaged completely. Moreover, without carrying out such a gear ratio control (torque control) as described in the JP-A-2004-225888 in which the torque that passes through the toroidal type continuously variable transmission is adjusted while roughly adjusting the rotational speed of the engine, the vehicle can be stopped in an ensured fashion or started from the rest state in a direction intended by the driver in a smooth fashion when the gearshift is operated. Due to this, the simplification of the construction of the control unit for controlling the gear ratio of the toroidal type continuously variable transmission can be realized. In addition, the predetermined amount by which the gear ratio is corrected when the gearshift is operated in the way described above only has to be small (a correction amount by which the gear ratio needs to be corrected when the vehicle is stopped or runs at extremely low speed is small). Due to this, for example, when the gearshift is shifted to the non-running state (N range) while the vehicle is running and is then shifted back to the running state (D range), even in the event that the gear ratio is corrected by the predetermined amount from a value resulting at the point of shifting as occurring when the vehicle is started from the rest state, a variation amount of the gear ratio produced while the vehicle is running should not be large. Consequently, even in the event that the gearshift is operated while running as described above, a risk can be prevented in which the vehicle speed is reduced unintentionally excessively.

With a view to carrying out the invention, according to a second aspect of the invention, there is preferably provided a continuously variable transmission system as set forth in the first aspect of the invention, wherein the predetermined amount of the gear ratio of the toroidal type continuously variable transmission to be corrected is, a difference between a GN value and a target value, wherein the GN value is a gear ratio of the toroidal type continuously variable transmission obtained when the output shaft is stopped while an input shaft is kept rotating in one direction in such a state that no load is applied to the output shaft, wherein the target value is a gear ratio of the toroidal type continuously variable transmission obtained when load on the output shaft is released from a state where the load is applied to the output shaft and the toroidal type continuously variable transmission transmits a predetermined through torque in a state that the output shaft is stopped while an input shaft is kept rotating in one direction, wherein the predetermined through torque is set within a range of values at which a state can be realized without stopping the driving source where the output shaft is stopped with the input shaft kept rotating due to a torque shift of the toroidal type continuously variable transmission, when a large load is applied to the output shaft with the input shaft kept rotating in one direction.

By adopting this configuration, when the gearshift is operated, the output shaft can be stopped based on the torque shift in the toroidal type continuously variable transmission with the input shaft kept rotating in one direction without stopping the engine (which is the driving source) even though the brake pedal is depressed. Namely, when large load is applied to the output shaft based on the depression of the brake pedal or the like in a state that the gear ratio of the toroidal type continuously variable transmission is deviated from the GN value, the large load is applied to the engine while the gear ratio is changed towards the GN value based on the torque shift occurring. Then, the gear ratio is corrected within a range where the engine is not stopped irrespective of the application of the load thereto. Due to this, even in the event that the output shaft is stopped based on the depression of the brake pedal or the like, the engine is not stopped in any case whether the load is applied to the engine based on the torque shift, the state can be maintained where the output shaft is stopped with the input shaft kept rotating in one direction.

Moreover, in this state, the gear ratio is (if no fluctuation occurs based on the torque shift) corrected to a value at which a driving force corresponding to the gear selection position to which the gearshift is operated. Due to this, when the depression of the brake pedal is released, the vehicle can be started from the rest state in a direction which the drivers intends.

Note that, as described above, the predetermined amount (correction amount), by which the gear ratio of the toroidal type continuously variable transmission is corrected, is small. Thus, a variation ratio (transmission amount), which is change in speed ratio of the gear ratio of the continuously variable transmission system in accordance with the correction of the predetermined amount of the gear ratio of the toroidal type continuously variable transmission, is small. That is, the correction amount of the transmission amount required in the rest state of running in extremely low speed, and hence, a variation amount of the speed ratio is small. Due to this, for example, when the gearshift is shifted to the non-running state (N range) while the vehicle is running and is then shifted back to the running state (D range), even in the event that the gear ratio is corrected by the predetermined amount from a value resulting at the point of shifting as occurring when the vehicle is started from the rest state, a variation amount of the gear ratio and hence the speed ratio produced while the vehicle is running should not be large. Consequently, even in the event that the gearshift is operated while running as described above, a risk can be prevented in which the vehicle speed is reduced unintentionally excessively.

In addition, with a view to carrying out the invention, according to a third aspect of the invention, there is preferably provided a continuously variable transmission system as set forth either of the first and second aspects of the invention, wherein the gear ratio of the toroidal type continuously variable transmission is corrected based on the operation of the gearshift.

By adopting the configuration above, when the gearshift is operated from the non-running state to the running state, the gear ratio can be corrected quickly, so that the vehicle can be stopped in an ensured fashion or be started from the rest state in a direction desired by the driver in a smooth fashion.

In addition, with a view to carrying out the invention, according to a fourth aspect of the invention, there is preferably provided a continuously variable transmission system as set forth in any of the first to third aspect of the invention, it is preferable that the gear ratio of the toroidal type continuously variable transmission is corrected in a state that the gearshift is in the non-running state.

Note that while the correction in this case is preferably such that the gear ratio is completely corrected to the full extent of the predetermined amount, the correction may be such that the gear ration is not completely corrected. Namely, the correction may be such that the gear ratio only has to be caused to deviate from the GN value. In the event that a correction which causes the gear ratio from the GN value is carried out, a variation amount (correction amount) of the gear ratio produced when the gearshift is operated to the running state can be reduced.

Namely, in general, since a vehicle runs forwards far more frequently than rearwards, similarly, the gearshift is operated from the non-running state to the forward positions far more frequently than to the reverse position. Due to this, according to a fifth aspect of the invention, there is provided a continuously variable transmission system as set forth in the fourth aspect of the invention, the gear ratio of the toroidal type continuously variable transmission is corrected to a value which corresponds to a forward position.

Thus, in the event that the gear ratio of the toroidal type continuously variable transmission is corrected to a value which corresponds to the forward position in such a state that the gearshift is shifted in the non-running state, the variation amount (correction amount) produced when the gearshift is operated to the forward position, to which the gearshift is highly frequently operated, can be reduced. In addition, when correcting the gear ratio to the value corresponding to the forward position, the complete correction to the full extent of the predetermined amount is also preferred. In this case, according to a sixth aspect of the invention, there is provided a continuously variable transmission system as set forth in the fifth aspect of the invention, it is preferable that when the gearshift is operated to the forward position, the gear ratio of the toroidal type continuously variable transmission is maintained at a corrected value.

In other words, with the clutch kept engaged, the driving force needed in the traveling direction can be outputted in an ensured fashion and momentarily. Due to this, when the gearshift is operated to the forward position to which it is operated highly frequently, an operation for changing the gear ratio becomes unnecessary, whereby the stabilization of the operation to correct the gear ratio is realized. In addition, as is described above, in the event that the gear ratio of the toroidal type continuously variable transmission is corrected in advance to the value corresponding to the forward position (more preferably, in the event that the gear ratio is corrected the primary driving member.

By adopting the configuration described above, even in the event that such a differential pressure cylinder as described in the JP-A-2004-225888 for carrying out the gear ratio control for adjusting the torque that passes through the toroidal type continuously variable transmission is not provided, the gear ratio of the toroidal type continuously variable transmission is corrected based on the operation of the primary driving member such as the stepping motor, whereby the vehicle can be stopped in an ensured fashion or started from the rest state in a direction desired by the driver in a smooth fashion. Due to this, the simplification of the construction of the control unit for controlling the gear ratio of the toroidal type continuously variable transmission can be realized.

In addition, with a view to carrying out the invention, according to an eighth aspect of the invention, there is preferably provided a continuously variable transmission system as set forth in any of the first to sixth aspects of the invention, further comprising a control unit for controlling the gear ratio of the toroidal type continuously variable transmission, the control unit comprising:

a primary electric switching valve for directly switching the supply and discharge of pressure oil to and from the actuator wherein the control unit adjusts the gear ratio at a normal time and also corrects the gear ratio in response to the operation of the gearshift by changing the switching state of the primary switching valve based on an operation of ratio control for adjusting the torque that passes through the toroidal type continuosly variable transmission is not provided, the gear ratio of the toroidal type continuously variable transmission is corrected based on the operation of the primary driving member such as the stepping motor, whereby the vehicle can be stopped in an ensured fashion or started from the rest state in a direction desired by the driver in a smooth fashion. Due to this, the simplification of the construction of the control unit for controlling the gear ratio of the toroidal type continuosly variable transmission can be realized.

In addition, with a view to carrying out the invention, according to a seventh aspect of the invention, there is preferably provided a continuously variable transmission system as set forth in any of the first to sixth aspects of the invention, further comprising a control unit for controlling the gear ratio of the toroidal type continuously variable transmission, the control unit comprising:

a primary driving electric switching valve for directly switching the supply and discharge of pressure oil to and from the actuator wherein the control unit adjusts the gear ratio at a normal time and also corrects the gear ratio in response to the operation of the gearshift by changing the switching state of the gear ratio control valve based on an operation of the primary driving member.

By adopting the configuration described above, since the supply state of pressure oil to the actuator is directly switched without the involvement of the gear ratio control valve described in the seventh aspect of the invention above, a delay in operation occurring when the desired gear shift is effected can be reduced. In addition, in association with this, the mechanism for feeding back the swinging or tilting of the power rollers to the gear ratio control valve can also be omitted, thereby making it possible to realize a more simplified construction.

Additionally, with a view to carrying out the invention, according to a ninth aspect of the invention, there is preferably provided a continuously variable transmission system as set forth in any of the first to eighth aspects of the invention, further comprising:

a secondary electric switching valve switching an engaged state and a disengaged state of the clutch device, wherein the clutch device is engaged based on the switching of the secondary switching valve in such a state that the gear ratio of the toroidal type continuously variable transmission has been corrected completely.

By adopting the configuration described above, the vehicle can be stopped in an ensured fashion or started from the rest state in a direction desired by the driver in a smooth fashion.

In addition, with a view to carrying out the invention, according to a tenth aspect of the invention, there is preferably provided a continuously variable transmission system as set forth in any of the first to sixth and ninth aspects of the invention, further comprising a control unit for controlling the gear ratio of the toroidal type continuously variable transmission, comprising:

a gear ratio control valve for switching supply and discharge of pressure oil to and from the actuator;

a primary driving member for changing the switching state of the gear ratio control valve; and a secondary driving member provided separately from the primary driving member for changing the switching state of the gear ratio control valve in response to the operation of the gearshift and wherein the gear ratio of the toroidal type continuously variable transmission is corrected by changing the switching state of the gear ratio control valve through a separate operation of the secondary driving member from the primary driving member.

By adopting the configuration described above, when the gearshift is operated from the non-running state to the running state, the gear ratio of the toroidal type continuously variable transmission is corrected by the predetermined amount by the secondary driving member which operates separately from the primary driving member such as the stepping motor. Due to this, the gear ratio of the toroidal type continuously variable transmission can be corrected quickly, whereby the vehicle can be stopped in an ensured fashion or started from the rest state in a direction desired by the driver in a smooth fashion.

In addition, with a view to carrying out the invention described in the tenth aspect of the invention, according to an eleventh aspect of the invention, there is preferably provided a variable transmission system as set forth in the tenth aspect of the invention, wherein the secondary driving member is a secondary actuator which is operated hydraulically.

In this case, according to a twelfth aspect of the invention, there is preferably provided a continuously variable transmission system as set forth in the eleventh aspect of the invention, further comprising a tertiary switching valve, of which switching state is changed based on the operation of the gearshift, for supplying and discharging the pressure oil to the secondary hydraulic actuator.

In addition, in this case, according to a thirteenth aspect of the invention, there is preferably provided a continuously variable transmission system as set forth in the twelfth aspect of the invention, wherein the tertiary switching valve is electrically operated.

Note that in a case where the tertiary switching valve is made up of the electric device like this, the switching of the switching valve can be effected based on a detection signal from a gearshift position detection sensor or the like which detects the gear selection position of the gearshift.

By adopting the configurations described above, the correction of the gear ratio by the secondary driving member can be effected quickly and in an ensured fashion. In addition, the tertiary switching valve is made up of the electric device, the correction of the gear ratio of the toroidal type continuously variable transmission can be carried out minutely by this tertiary switching valve. In addition, when the switching of the electric tertiary gearshift is performed based on a detection signal of the gearshift position sensor, no oil communication path needs to be provided between the electric switching valve and a manual oil pressure switching valve, the reduction in the size of a valve body can be realized in which the switching valves and oil communication paths are incorporated.

Additionally, with a view to carrying out the inventive step described in the tenth aspect of the invention, according to a fourteenth aspect of the invention, there is preferably provided a continuously variable transmission system as set forth in the tenth aspect of the invention, wherein the secondary driving member is a secondary actuator which is operated electrically, and the secondary actuator is operated based on the operation of the gearshift.

In this case, the second actuator can be driven based on a detection signal of the gearshift position detection sensor for detecting the gear selection position of the gearshift.

By adopting the configuration described above, the hydraulic circuit can be simplified, increasing the degree of freedom in design.

Additionally, with a view to carrying out the inventive step described in the tenth aspect of the invention, according to a fifteenth aspect of the invention, there is preferably provided a continuously variable transmission system as set forth in the tenth aspect of the invention, wherein the secondary driving member is a member which is displaced based on a force with which the gearshift is operated, and the switching state of the gear ratio control valve is changed based on a displacement of the secondary driving member to corrects the gear ratio of the toroidal type continuously variable transmission.

By adopting the configuration described above, the change of the switching state of the gear ratio control valve (the correction of the gear ratio) can be effected mechanically with no hydraulic circuit nor electric circuit. Due to this, the system is prevented from getting complex in construction and is made difficult to fail. In addition, a slippage on timing (a delay in operation) between a timing at which the gearshift is operated and a timing at which the gear ratio is corrected actually can be made difficult to occur.

In addition, with a view to carrying out the inventive steps described in the tenth to fifteenth aspects of the invention, according to a sixteenth aspect of the invention, there is preferably provided a continuously variable transmission system as set forth in any of the tenth to fifteenth aspects of the invention, wherein the gear ratio control valve, the primary driving member and the secondary driving member are linked together by a link arm.

By adopting the configuration like this, the construction for switching the gear ration control valve can be configured without enlarging in size and making complex in configuration the construction by the primary driving member for performing the normal gear ratio control and the secondary driving member for performing the correction of the gear ratio when the gearshift is operated.

Additionally, with a view to carrying out the invention, according to a seventeenth aspect of the invention, there is preferably provided a continuously variable transmission system as set forth in any of the first to sixteenth aspects of the invention, wherein the gear ratio of the toroidal type continuously variable transmission is corrected within a range including the GN value, when the gearshift is operated between a reverse position and a group of positions including any other selecting positions than the reverse position.

By adopting the configuration described above, even when the gearshift is operated to either of the gear selection positions of the forward position and the reverse position (respective traveling directions are opposite), the gear ratio of the toroidal type continuously variable transmission can be corrected to the value at which the driving force can be outputted which corresponds to the traveling direction inherent in the gear selection position to which the gearshift is operated. Due to this, the vehicle can be prevented from traveling in an opposite direction to one intended by the driver in an ensured fashion.

Additionally, with a view to carrying out the invention, according to an eighteenth aspect of the invention, there is preferably provided a continuously variable transmission system as set forth in any of the first to seventeenth aspects of the invention, wherein the gear ratio of the toroidal type continuously variable transmission is corrected such that:

before the clutch device is made ready for transmission of power, correcting the gear ratio to a primary correction value by correcting the predetermined amount to be corrected; and correcting the gear ratio from the primary correction value to a secondary correction value whether or not the clutch device has been made ready for transmission of power.

In this case, according to a nineteenth aspect of the invention, there is preferably provided a continuously variable transmission system as set forth in the eighteenth aspect of the invention, wherein the primary correction value is a value which ensures the output from the output shaft of a driving force which enables a vehicle to start from a rest state and run at low speed in a direction corresponding to a position to which the gearshift is operated, and the secondary correction value is a value which enables the output of a driving force which is smaller than a driving force outputted in such a state that the gear ratio is corrected to the primary correction value.

Consequently, when the gear ratio is corrected from the primary correction value to the secondary correction value like this, the correction is preferably carried out from the state where the slightly strong creeping force can be outputted towards the state where the creeping force is weakened (becomes smaller).

By adopting the configurations described above, by correcting the gear ratio to the primary correction value before the clutch device is made ready for transmission of power, the vehicle can be prevented from traveling in an opposite direction to one intended by the driver. In addition to this, by correcting the gear ratio further from the state where it is corrected to the primary correction value to the secondary correction value, the driving force that is outputted from the output shaft can be adjusted to an optimal value (for example, values which will be described in twenty-seventh and twenty-eighth aspects of the invention) available then. Moreover, even in the event that the clutch device is made ready for transmission of power before the gear ratio is corrected to the secondary correction value, since the resulting gear ratio is corrected to at least the primary correction value at which the slightly strong creeping force can be outputted or a value between the primary correction value and the secondary correction value, the vehicle can be prevented from traveling in an opposite direction to one intended by the driver in an ensured fashion.

In addition, with a view to carrying out the inventive steps described in the eighteenth and nineteenth aspects of the invention, according to a twentieth aspect of the invention, there is preferably provided a continuously variable transmission system as set forth in either of the eighteenth and nineteenth aspects of the invention, wherein the gear ratio of the toroidal type continuously variable transmission is corrected to the primary correction value which corresponds to a forward direction in such a state that the gearshift is in the non-running state.

In this case, according to a twenty-first aspect of the invention, there is preferably provided a continuously variable transmission system as set forth in the twentieth aspect of the invention, wherein the gear ratio of the toroidal type continuously variable transmission is maintained at the primary correction value which corresponds to the forward direction when the gearshift is operated to a forward position.

In addition, the gear ratio is corrected from this primary correction value to the secondary correction value as required.

By adopting the configurations described above, since the gear ratio of the toroidal type continuously variable transmission is corrected to the primary correction value which corresponds to the forward direction in a state that the gearshift is shifted in the non-running state resulting before it is operated to the power position, when the gearshift is operated to the forward position, by simply engaging the clutch, the driving force needed in the forward direction (the slightly strong creeping force) can be outputted in an ensured fashion and momentarily. Moreover, when the gearshift is operated from the non-running state to the forward position to which the gearshift is operated highly frequently, since the gear ratio of the toroidal type continuously variable transmission does not have to be corrected to the primary correction value (the gear ratio may be maintained at the primary correction value to which it was corrected in the non-running state, and the gear ratio can be corrected from the primary correction value to the secondary correction value), the stabilization of the gear shift operation effected when correcting the gear ratio can also be realized.

In addition, with a view to carrying out the inventive steps described in the eighteenth to twenty-first aspects of the invention, according to a twenty-second aspect of the invention, there is preferably provided a continuously variable transmission system as set forth in any of the eighteenth to twenty-first aspects of the invention, wherein the gear ratio of the toroidal type continuously variable transmission is corrected to a value lying opposite to the primary correction value corresponding to the forward position across the GN value when the gearshift is operated to the reverse position. Further, it is preferable that the gear ratio of the toroidal type continuously variable transmission is corrected to the primary correction value corresponding to the reverse position when the gearshift is operated to the reverse position.

By adopting the configuration like this, even when the gearshift is operated to the reverse position, the vehicle can be prevented from traveling in an opposite direction to one intended by the driver in an ensured fashion.

In addition, with a view to carrying out the inventive steps described in the eighteenth to twenty-third aspects of the invention, according to a twenty-fourth aspect of the invention, there is preferably provided a continuously variable transmission system as set forth in any of the eighteenth to twenty-third aspects of the invention, wherein the gear ratio of the toroidal type continuously variable transmission is corrected from the primary correction value to the secondary correction value based on the operation of the gearshift.

For example, by detecting the operation of the gearshift based on a detection signal from the gearshift position detection sensor for detecting the gear selection position of the gearshift, the gear ratio is corrected from the primary correction value to the secondary correction value in response to the detection signal.

In this case, according to a twenty-fifth aspect of the invention, there is preferably provided a continuously variable transmission system as set forth in the twenty-fourth aspect of the invention, wherein the gear ratio of the toroidal type continuously variable transmission is corrected from the primary correction value corresponding to the forward direction to the secondary correction value on a condition where the gearshift is operated to the forward position.

In addition, according to a twenty-sixth aspect of the invention, there is preferably provided a continuously variable transmission system as set forth in the twenty-fourth aspect of the invention, wherein the gear ratio of the toroidal type continuously variable transmission is corrected from the primary correction value corresponding to the reverse direction to the secondary correction value on a condition that the gearshift is operated to the reverse position.

By adopting the configurations described above, when the gearshift is operated to the forward position and the reverse position, the gear ratio of the toroidal type continuously variable transmission is corrected from the primary correction value which corresponds to a traveling direction corresponding to the position to which the gearshift is operated to the secondary correction value, so that an optimal driving force (creeping force) can be made to be outputted from the output shaft.

Additionally, with a view to carrying out the inventive steps described in the eighteenth to twenty-sixth aspects of the invention, according to a twenty-seventh aspect of the invention, there is preferably provided a continuously variable transmission system as set forth in any of the eighteenth to twenty-sixth aspects of the invention, wherein the secondary correction value is a value which enables the output from the output shaft of an optimal driving force which is determined according to a state amount which affects a driving force to be outputted.

The state amount like this is obtained in advance as a correlation with the value (the secondary correction value) at which a more optimal driving force can be outputted and is stored in a memory of the control unit in the form of a map or expression. Note that it is preferable that the state amount is temperature of lubricating oil residing therein.

By adopting the configuration like this, the more optimal driving force according to the state amount such as the temperature of the lubricating oil that is available then can be outputted from the output shaft in such a state that the gear ratio of the toroidal type continuously variable transmission is corrected to the secondary correction value.

Furthermore, with a view to carrying out the invention, according to a twenty-ninth aspect of the invention, there is preferably provided a continuously variable transmission system as set forth in any of the first to twenty-eighth aspects of the invention, wherein after the gear ratio of the toroidal type continuously variable transmission has been corrected by the predetermined value, an actual driving force outputted from the output shaft is obtained, the gear ratio is further corrected based on the actual driving force.

In this case, according to a thirtieth aspect of the invention, there is preferably provided a continuously variable transmission system as set forth in the twenty-ninth aspect of the invention, wherein the actual driving force is obtained based on a differential pressure between a pair of oil chambers of actuators, the differential value being proportioned to a torque that passes through the toroidal type continuously variable transmission, wherein the gear ratio of the toroidal type continuously variable transmission is corrected according to the differential pressure of the actuator.

To describe more specifically, a differential pressure corresponding to a driving force which constitutes the reference, in other words, a differential pressure corresponding to an optimal driving force to be outputted is obtained in advance. After that, while comparing an actual differential pressure with the differential pressure corresponding to the optimal driving force that is available then, the gear ratio of the toroidal type continuously available transmission is corrected. For example, in a case where the actual pressure is greater than the differential pressure corresponding to the optimal driving force, it is determined that the torque that passes through the toroidal type continuously variable transmission (the through torque), hence, the driving force (the creeping force) that is outputted from the output shaft is greater than the optimal value. In this case, the gear ratio of the toroidal type continuously variable transmission is corrected so that the differential pressure (the through torque, the driving force) is reduced. On the contrary to this, the actual differential pressure is smaller than the optimal driving force that is available then, the gear ratio of the toroidal type continuously variable transmission is corrected so that the differential pressure (the through torque, the driving force) is increased.

By adopting the configuration described above, since while obtaining a driving force that is actually outputted (actually, obtaining a differential pressure corresponding to the driving force), this driving force (the differential pressure) is adjusted, the optimal driving force that is available then can be outputted minutely and accurately. Due to this, the vehicle can be prevented from traveling in an opposite direction to one intended by the driver in an ensured fashion.

In addition, when the gear ratio is started to be corrected according to (the differential pressure corresponding to) the actual driving force in the way described above, the gear ratio of the toroidal type continuously variable transmission is corrected by the predetermined amount. As this occurs, this correction may be such as to involve as far as the primary correction value or may be such as to involve as far as the secondary correction value. In either of the cases, while (the differential pressure corresponding to) the driving force is obtained after the gear ratio has been corrected by the predetermined amount (corrected to the primary correction value or the secondary correction value), the gear ratio is corrected further according to (the differential pressure corresponding to) the driving force so obtained. In addition, the gear ratio correction can be carried out based on the differential pressure between the hydraulic chambers of the actuator, provided that the clutch device is engaged (the clutch device is made ready for transmission of power) so as to result in a state where the torque that passes through the toroidal type continuously variable transmission can be detected as a differential pressure between the hydraulic chambers of the actuator.

DETAILED DESCRIPTION OF THE PREFERRED EMBODIMENTS

Embodiment 1

Figure 1:
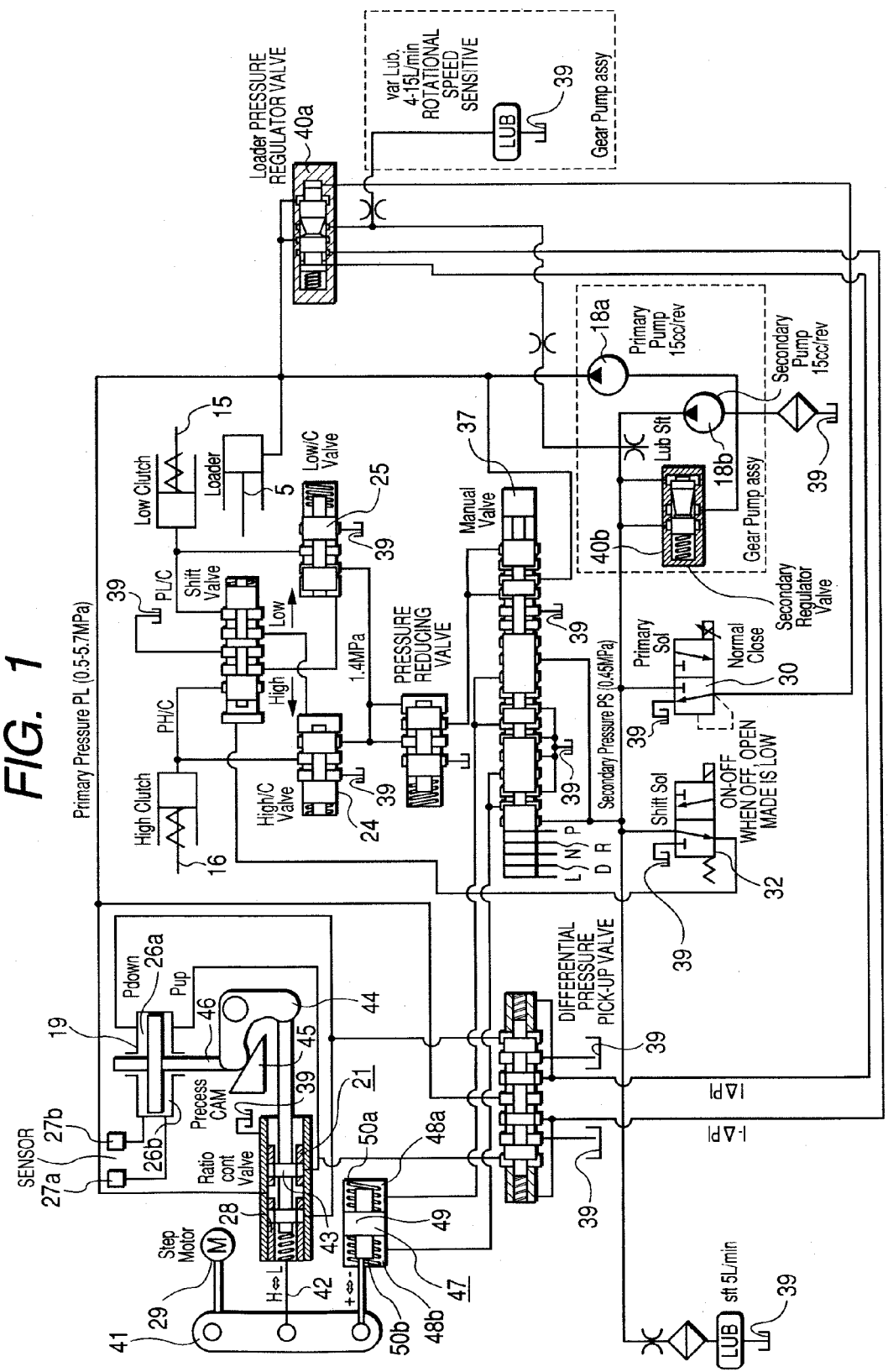
FIG. 1 is a hydraulic circuit diagram showing Embodiment 1 of the invention.
Figure 2:
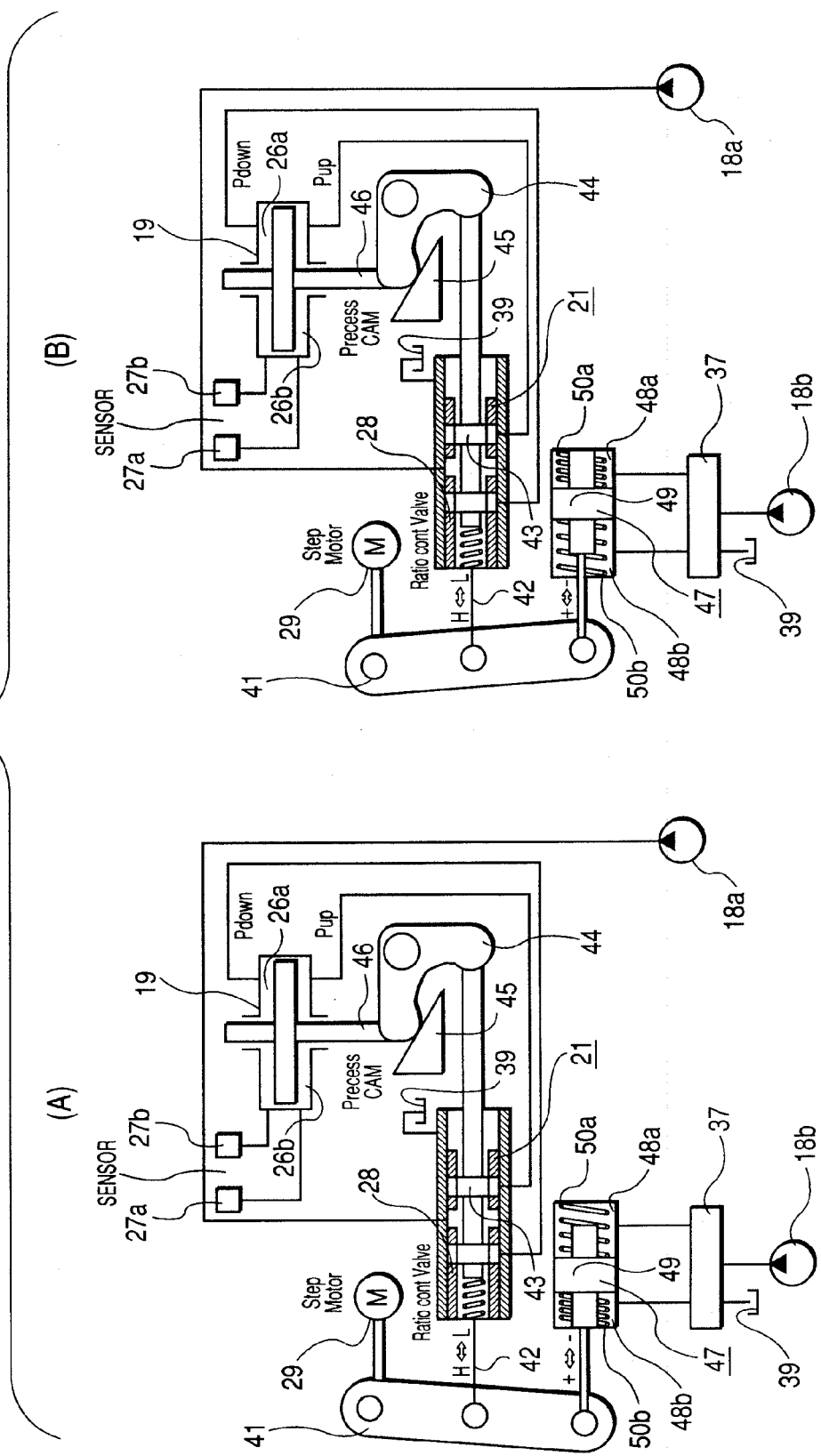
FIG. 2 are diagrams showing a control unit portion for controlling the gear ratio of a toroidal type continuously variable transmission as being taken out of the whole hydraulic circuit shown in FIG. 1, wherein (A) shows a state where a gearshift is operated to a forward position, and (B) shows a state where the gearshift is operated to a reverse position.
Figure 3:
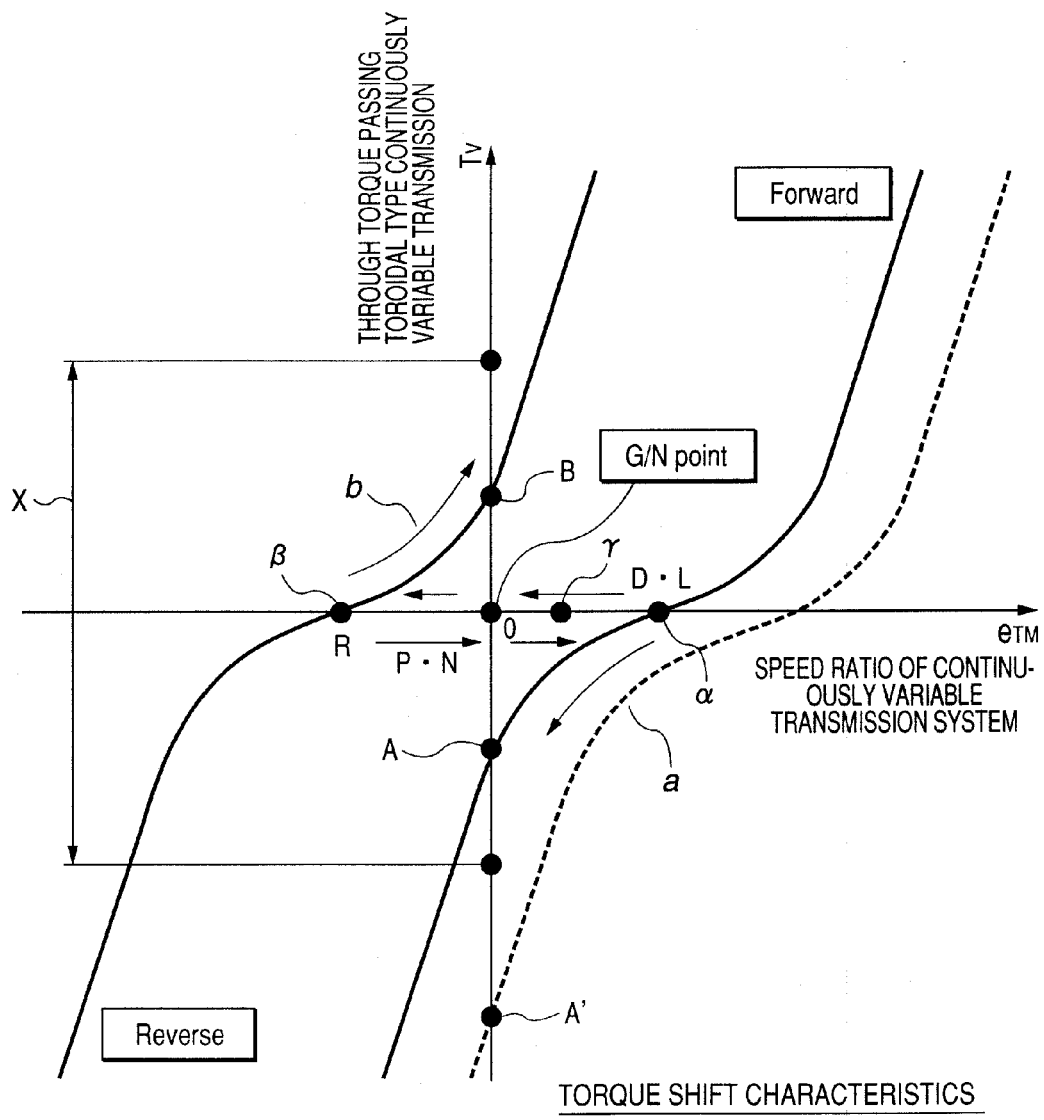
FIG. 3 is an explanatory diagram which explains a correction amount of the gear ratio of the toroidal type continuously variable transmission.

FIGS. 1 to 3 show Embodiment 1 of the invention which corresponds to the first to third, tenth to twelfth, sixteenth and seventeenth aspects of the invention. The gist of this embodiment resides in that the construction of a control unit for adjusting a gear ratio of a toroidal type continuously variable transmission which makes up a continuously variable transmission system is devised in order to improve characteristics of a vehicle when it starts from a rest state. A basic construction itself of the continuously variable transmission is similar to the construction shown in FIGS. 15 to 16, and hence, illustrations and description of the relevant portion of the transmission system will be omitted or simplified, characteristic parts of the invention being mainly described.

Pressure oil is made free to be supplied and discharged to and from a pair of hydraulic chambers 26a, 26b which make up a hydraulic actuator 19 for displacing (in an axial direction of pivot shafts) support members such as trunnions making up a toroidal type continuously variable transmission 4 (refer to FIG. 15) via a gear ratio control valve 21. A sleeve 28 making up the gear ratio control valve 21 is made free to be displaced in the axial direction by a stepping motor 29, which corresponds to the primary driving member described in the claims of the invention, via a link arm 41 and a rod 42. In addition, a spool 43, which makes up the gear ratio control valve 21, is brought into engagement with the support members via a link arm 44, a precess cam 45 and a rod 46 and is made free to be displaced in the axial direction in association with the displacement (in the axial direction of the pivot shafts) and swing of the support members. Thus, this configuration is basically the same as the gear ratio controlling mechanism of the toroidal type continuously variable transmission 4 conventionally known or shown in FIGS. 15 to 16.

In the case of this embodiment, in particular, the sleeve 28 is also made to be driven by not only the stepping motor 29 but also a secondary hydraulic actuator 47, which corresponds to the secondary driving member. Namely, a distal end portion of the rod 42 connected to the sleeve 28 at a proximal end portion thereof is pivotally supported at an intermediate portion of the link arm 41, and an output portion of the stepping motor 29 or the secondary actuator 47 is connected to both end portions of the link arm 41. When one end portion of the link arm 41 is pushed and pulled, the engagement portion at the other end portion constitutes a fulcrum. By adopting this configuration, the sleeve 28 is made to be displaced in the axial direction by not only the stepping motor 29 but also the secondary actuator 47. Note that the positional relationship of the stepping motor 29, the secondary actuator 47 and the sleeve 28 of the gear ratio control valve 21 in a longitudinal direction (a vertical direction as viewed in FIG. 1) of the link arm 41 is not limited to that shown in FIG. 1. For example, although not shown, the output portion of the secondary actuator 47 may be pivotally supported at an intermediate portion of the link arm 41, while the stepping motor 29 (or the secondary actuator 47) or the sleeve 28 of the gear ratio control valve 21 may be brought into engagement with the end portions of the link arm 41.

In the case of the embodiment that is configured as described above, when a gearshift provided in the vicinity of a driver's seat is shifted from a non-running state to a running state, a gear ratio of the toroidal type continuously variable transmission 4 is corrected by a predetermined amount by virtue of the displacement of the sleeve 28 by the secondary actuator 47, separately from the actuation by the stepping motor 29. In addition, as this occurs, the gear ratio of the toroidal type continuously variable transmission 4 is corrected by the predetermined amount before a low-speed clutch 15 (or a high-speed clutch 16) is engaged based on the gearshift operation so that the low-speed clutch 15 (or the high-speed clutch 16) is made ready for transmission of power. Due to this, in the case of the embodiment, pressure oil is made free to be introduced into a pair of hydraulic chambers 48a, 48b provided in the secondary actuator 47 through a manual oil pressure switching valve 37 which can be switched directly by the gearshift.

Namely, the supply and discharge of pressure oil to and from the individual hydraulic chambers 48a, 48b is made free to be switched over or selected according to a position to which the manual oil pressure switching valve 37 is shifted. To describe specifically, when the gearshift is shifted in a P range (a parking position) or an N range (a neutral position), which is the non-running state, the individual hydraulic chambers 48a, 48b are made to communicate with an oil reservoir 39 based on the switching of the manual oil pressure switching valve 37, whereby pressure oil in these hydraulic chambers 48a, 48b is discharged. In this state, a spool 49 of the secondary actuator 47 lies at a neutral position based on pressure of springs 50a, 50b which are elastic members provided within the hydraulic chambers 48a, 48b, respectively, and the gear ratio of the toroidal type continuously variable transmission 4 does not change (the gear ratio is controlled only by the stepping motor 29 and is corrected in no case by the secondary actuator 47).

In contrast, when the gearshift is operated to a forward position (D, L range), pressure oil is supplied to one (a right one in FIGS. 1 to 2) or the hydraulic chamber 48a of the hydraulic chambers 48a, 48b, as shown in FIG. 2(A), based on the switching of the manual oil pressure switching valve 37, and the other hydraulic chamber 48a is made to communicate with the oil reservoir 39, whereby pressure oil within the other hydraulic chamber 48b is discharged thereinto. As a result, the spool 49 of the secondary actuator 47 is displaced axially in one direction (to the left in FIGS. 1 to 2) based on the supply of pressure oil into the hydraulic chamber 48a. Then, based on this displacement of the spool 49, the link arm 41 swings on the engagement portion with the stepping motor 29 as a fulcrum in a direction which displaces the sleeve 28 of the gear ratio control valve 21 axially in one direction (to the left in FIGS. 1 to 2), whereby the gear ratio of the toroidal type continuously variable transmission 4 is corrected by the predetermined amount.

In addition, when the gear ratio of the toroidal type continuously variable transmission 4 is corrected, there occurs a state where the spool 49 of the secondary actuator 47 is completely displaced axially in the one direction as shown in FIG. 2(A) in an extremely short period of time since the supply of pressure oil into the hydraulic chamber 48a has been started based on the operation of the gearshift. Namely, the spool 49 is completely displaced in the axial direction as is described above by the oil pressure within the hydraulic chamber of the low-speed clutch 15 (or the high-speed clutch 16) rises to an oil pressure sufficient for the low-speed clutch 15 (or the high-speed clutch 16) to transmit power based on the operation of the gearshift. Due to this, the gear ratio of the toroidal type continuously variable transmission 4 is corrected by the predetermined amount before the low-speed clutch 15 (or the high-speed clutch 16) is made ready for transmission of power. In addition, the predetermined amount by which the gear ratio is corrected can be adjusted to a desired value by controlling the axial displacement amount of the spool 49 of the secondary actuator 47.

Additionally, when the gearshift is operated to the reverse position (R range), pressure oil is supplied to the other hydraulic chamber 48b of the pair of hydraulic chambers 48a, 48b as shown in FIG. 2(B), while the hydraulic chamber 48a is made to communicate with the oil reservoir 39, whereby pressure oil in the hydraulic chamber 48a is discharged thereinto. As a result, the spool 49 of the secondary actuator 47 is displaced axially in the other direction (to the right in FIGS. 1 to 2) based on the supply of pressure oil into the other hydraulic chamber 48b. Then, based on the displacement of the spool 49, the link arm 41 swings on the engagement portion with the stepping motor 29 as the fulcrum in a direction which displaces the sleeve 28 of the gear ratio control valve 21 axially in the other direction (to the right in FIGS. 1 to 2), whereby the gear ratio of the toroidal type continuously variable transmission 4 is corrected by the predetermined amount.

In addition, when the gear ratio of the toroidal type continuously variable transmission 4 is corrected, there occurs a state where the spool 49 of the secondary actuator 47 is completely displaced axially in the other direction as shown in FIG. 2(B) in an extremely short period of time since the supply of pressure oil into the hydraulic chamber 48b has been started based on the operation of the gearshift. Namely, the spool 49 is completely displaced in the other axial direction, as is described above, by the time when the oil pressure within the hydraulic chamber of the low-speed clutch 15 rises to an oil pressure sufficient for the low-speed clutch 15 to transmit power based on the operation of the gearshift. Due to this, the gear ratio of the toroidal type continuously variable transmission 4 is corrected by the predetermined amount before the low-speed clutch 15 is made ready for transmission of power. In addition, the predetermined amount by which the gear ratio is corrected can be adjusted to a desired value by controlling the axial displacement amount of the spool 49 of the secondary actuator 47.

The predetermined amount, by which the gear ratio of the toroidal type continuously variable transmission is corrected based on the operation of the secondary actuator 47 (the displacement of the spool 49) in the way described above, is made to be an amount which corresponds to an amount which allows the gear ratio of the continuously variable transmission system to be changed from a GN position (a G/N point, O point) to a position α or a position β, as shown in FIG. 3. In FIG. 3, the gear ratio of the continuously variable transmission system is represented on the axis of abscissa and a through torque of the toroidal type continuously variable transmission on the axis of ordinates. In addition, in the gear ratio of the continuously variable transmission system, a forward side is represented as positive (+) and a reverse side as negative (−), and in the through torque. A case where torque is transmitted from an input disk to an output disk (a reverse driving force is generated) is represented as positive (+), and a case where torque is transmitted from the output disk to the input disk (a forward driving force is generated) as negative (−). In addition, the GN position is a position which produces a state where an output shaft 14 (refer to FIG. 15) of the continuously variable transmission system can be stopped with an input shaft 3 (refer to FIG. 15) kept rotating in one direction in such a state that a load resulting from the depression of a brake pedal or the like is not applied to the output shaft 14. A value of the gear ratio of the toroidal type continuously variable transmission 4 which can realize such the state is the GN value. In the event of this embodiment, with the vehicle stopped and the gearshift shifted in the non-running state (P, N range), the gear ratio of the toroidal type continuously variable transmission 4 is adjusted to the GN value based on the drive of the stepping motor 29.

In addition, the position α is a position to which the gear ratio of the continuously variable transmission system is changed from the GN position due to the gear ratio of the toroidal type continuously variable transmission 4 being corrected by the predetermined amount from the GN value based on the operation of the secondary actuator 47 when the gearshift is operated from the non-running state (P, N range) to the forward position (D, L range) in a state that no load is applied to the output shaft 14. Similarly, the position β is a position to which the gear ratio of the continuously variable transmission system is changed from the GN position due to the gear ratio of the toroidal type continuously variable transmission 4 being corrected by the predetermined amount from the GN value based on the operation of the secondary actuator 47 when the gearshift is operated from the non-running state (P, N range) to the reverse position (R range) in such a state that no load is applied to the output shaft 14.

The positions α,β, which are changed based on the drive of the secondary actuator 47, change to positions A, B, respectively, as indicated by arrows a, b, respectively, in FIG. 3 in such a state that a large load is applied to the output shaft 14 based on the depression of the brake pedal or the like. Namely, when a large load is applied to the output shaft 14 by virtue of the depression of the brake pedal or the like, the gear ratio of the continuously variable transmission system is changed to the GN value based on a torque shift occurring then, even though the gear ratio of the toroidal type continuously variable transmission 4 does not take the GN value, whereby the output shaft 14 is put in a stopped state with the input shaft 3 kept rotating in one direction. As this occurs, a state is realized where the gear ratio of the continuously variable transmission system becomes 0 while torque passing through the toroidal type continuously variable transmission 4 increases. In the event of this embodiment, the positions A, B control the predetermined amount of the toroidal type continuously variable transmission 4 that is corrected based on the drive of the secondary actuator 47 so that the torque passing through the toroidal type continuously variable transmission 4 falls within a range X, that is, a range of values at which a state can be realized where the output shaft 14 can be stopped with the input shaft 3 kept rotating in one direction without a risk that an engine 1 (refer to FIG. 15), which is a driving source, is stopped (the engine stalls).

In addition, when the torque passing through the toroidal type continuously variable transmission 4 is adjusted to a position which exceeds the range X, for example, the through torque is adjusted to a position A' lying on a broken line in FIG. 3, the output shaft 14 cannot be stopped with the input shaft 3 kept rotating in one direction and without stopping the engine 1. Namely, when a large load is applied to the output shaft 14 by virtue of the depression of the brake pedal or the like, a large load is applied to the engine 1 based on a torque shift occurring then, leading to a risk that the engine 1 stalls.

Due to this, in the event of this embodiment, as has been described before, the predetermined amount by which the gear ratio of the toroidal type continuously variable transmission system 4 is corrected based on the drive of the secondary actuator 47 is set to the amount corresponding to the amount which changes the gear ratio from the GN value to the value (position A, position B) at which a driving force (driving torque) corresponding to the position to which the gearshift is operated can be outputted from the output shaft 14 within the range of values at which the state can be realized without stopping the engine 1 where when the large load is applied to the output shaft 14 with the input shaft 3 kept rotating in one direction, the output shaft 14 can be stopped with the input shaft 3 kept rotating in one direction based on the torque occurring then (the range X). Note that the range X can be obtained in advance through experiments.

In addition, the driving force (driving torque) that is outputted from the output shaft 14 can be controlled to a desired value or to, for example, a level substantially equal to the creeping force that is outputted from a conventional automotive automatic transmission by adjusting the position A, position B (within the range X). To describe specifically, a driving force substantially equal to the creeping force outputted from the conventional automotive automatic transmission can be outputted in the event that the tilt amount (swing amount) of power rollers 7 (refer to FIG. 15) making up the toroidal type continuously variable transmission 4 is changed by on the order of 3 degrees (on the order of 5% of total gear ratio width) from a state where the GN value can be realized. In other words, a variation amount of the secondary actuator 47 is set so that the swing amount of the power rollers 7 changes on the order of 3 degrees based on the displacement of the secondary actuator 47, a force substantially equal to the conventional creeping force can be outputted from the output shaft 14 when the gearshift is operated to the running state.

For example, a case will be described where the gearshift is operated to the forward position (D range, L range) from a state where the gearshift is shifted in the non-running state (P range, N range) and the gear ratio of the toroidal type continuously variable transmission is adjusted to the GN value based on the operation of the stepping motor 29 (a vehicle stopped state). In this case, the secondary actuator 47 is displaced from the state shown in FIG. 1 to the state shown in FIG. 2(A). Then, the gear ratio of the toroidal type continuously variable transmission 4 is corrected based on the displacement of the secondary actuator 47 in the way described above so that the speed ratio of the continuously variable transmission system is changed from the GN position to the position α. In addition, as this occurs, the low-speed clutch 15 is engaged so as to be made ready for transmission of power) in a state that the speed ratio is completely corrected. Consequently, when the large load is being applied to the output shaft 14 based on the depression of the brake pedal or the like in this state, a state can be realized (the position A is attained) where the gear ratio of the toroidal type continuously variable transmission 4 is changed to the GN value based on a torque shift occurring in the toroidal type continuously variable transmission 4 and the output shaft 14 is stopped with the input shaft 3 kept rotating in one direction while the torque passing through the toroidal type continuously variable transmission 4 increases. When the depression of the brake pedal is released in this state, a driving force (creeping force) needed in the traveling direction can be outputted from the output shaft 14, and the vehicle can be started from the rest state in a direction intended by the driver (forward) in a smooth fashion.

Additionally, in contrast to this, a case will be described where the gearshift is operated to the reverse position (R range) from a state where the gearshift is shifted in the non-running state (P range, N range) and the gear ratio of the toroidal type continuously variable transmission is adjusted to the GN value based on the operation of the stepping motor 29 (a vehicle stopped state). In this case, the secondary actuator 47 is displaced from the state shown in FIG. 1 to the state shown in FIG. 2(B). Then, the gear ratio of the toroidal type continuously variable transmission 4 is corrected based on the displacement of the secondary actuator 47 in the way described above so that the speed ratio of the continuously variable transmission system is changed from the GN position to the position β. In addition, as this occurs, the low-speed clutch 15 is engaged so as to be made ready for transmission of power in a state that the speed ratio is completely corrected. Consequently, when the large load is being applied to the output shaft 14 based on the depression of the brake pedal or the like in this state, a state can be realized (the position B is attained) where the gear ratio of the toroidal type continuously variable transmission 4 is changed to the GN value based on a torque shift occurring in the toroidal type continuously variable transmission 4 and the output shaft 14 is stopped with the input shaft 3 kept rotating in one direction while the torque passing through the toroidal type continuously variable transmission 4 increases. When the depression of the brake pedal is released in this state, a driving force (creeping force) needed in the reverse direction can be outputted from the output shaft 14, and the vehicle can be started from the rest state in a direction intended by the driver (rearward) in a smooth fashion.

In the case of the embodiment described above, when the gearshift is operated from one selecting position to the other selecting position of the running state selecting positions, that is, the forward position (D range, L range) and the reverse position (R range) via the neutral position (N range) which is the non-running state, the gear ratio of the toroidal type continuously variable transmission 4 is corrected based on the operation of the secondary actuator 47 in such a manner that the torque passing through the toroidal type continuously variable transmission 4 is reversed (in such a manner as to straddle the GN value within the range including the GN value). Namely, when the gearshift is operated from the D range or L range to the R range across the N range, the secondary actuator 47 is displaced from the state shown in FIG. 2(A) to the state shown in FIG. 2(B). Then, the gear ratio of the toroidal type continuously variable transmission 4 is corrected based on the displacement of the secondary actuator 47 in such a manner that the speed ratio of the continuously variable transmission system is moved from the position α to the position β in FIG. 3. As this occurs, when the large load is being applied to the output shaft 14 based on the depression of the brake pedal or the like, the torque passing through the toroidal type continuously variable transmission 4 is changed in such a manner as to be reversed from the position A to the position B in FIG. 3. On the contrary to this, when the gearshift is operated from the R range to the D range or L range across the N range, the secondary actuator 47 is displaced from the state shown in FIG. 2(B) to the state shown in FIG. 2(A). Then, the gear ratio of the toroidal type continuously variable transmission 4 is corrected based on the displacement of the secondary actuator 47 in such a manner that the speed ratio of the continuously variable transmission system is moved from the position β to the position α in FIG. 3. As this occurs, when the large load is being applied to the output shaft 14 based on the depression of the brake pedal or the like, the torque passing through the toroidal type continuously variable transmission 4 is changed in such a manner as to be reversed from the position B to the position A in FIG. 3.

In the case of the embodiment that is configured as described above, characteristics of the vehicle when starting from rest can be improved. Namely, when the gearshift is operated from the non-running state (P, N range) to the running state (D, L, R range), the gear ratio of the toroidal type continuously variable transmission 4 is corrected by the predetermined amount based on the displacement of the secondary actuator 47 before the low-speed clutch 15 is engaged so as to be made ready for transmission of power. Due to this, the vehicle can be stopped in an ensured fashion or started from the rest state in a direction intended by the driver in a smooth fashion.

Namely, the event of the embodiment, when the gearshift is operated, the secondary actuator 47, which operates separately from the stepping motor 29 constituting the primary driving member and which constitutes the secondary driving member, corrects the gear ratio of the toroidal type continuously variable transmission 4 by the predetermined amount. In addition, this secondary actuator 47 is hydraulic type which has superior response. Due to this, the gear ratio of the toroidal type continuously variable transmission 4 can be corrected by the predetermined amount quickly before the state is attained where the oil pressure in the hydraulic chamber of the low-speed clutch 15 rises to an oil pressure sufficient for the low-speed clutch 15 to transmit power, and the vehicle can be stopped in an ensured fashion or started from the rest state in a direction intended by the driver in a smooth fashion. Due to this, the construction of the control unit for controlling the gear ratio of the toroidal type continuously variable transmission 4 can be simplified.

The amount by which the gear ratio of the toroidal type continuously variable transmission is corrected based on the operation of the secondary actuator 47 and hence the amount in which the speed ratio of the continuously variable transmission system changes based on the correction of the gear ratio are small as has been described by reference to FIG. 3. Namely, the amount, in which the speed ratio of the continuously variable transmission system changes based on the operation of the secondary actuator 47, is an amount needed for the speed ratio to be changed from the GN position to the position α or the position β in FIG. 3 and is suppressed to a small amount in which on the order of 5% of total gear ratio width. Due to this, even in the event that the secondary actuator 47 is made to operate in the same way as when the vehicle starts from rest by the operation of the gearshift from the non-running state (N range) to the running state (Drange or the like) while running, the gear ratio and hence the speed ratio that are to be changed (corrected) based on the operation of the secondary actuator 47 should not be large. Due to this, even in the event that the gear ratio of the toroidal type continuously variable transmission is corrected based on the drive of the secondary actuator 47 while running and hence the speed ratio of the continuously variable transmission system is changed based on the correction so made, there is caused no risk that the vehicle is reduced in speed unfavorably excessively.

Furthermore, according to the embodiment, when the gearshift is operated from the D, L range to the R range or from the R range to the D, L range, the torque passing through the toroidal type continuously variable transmission 4 reverses immediately as shown in FIG. 3. Due to this, a driving force corresponding to the gear selection position, to which the gearshift is shifted, can be outputted from the output shaft 14 in an ensured fashion, whereby the vehicle can be prevented from traveling in a direction, to which the driver does not intend. Moreover, according to the embodiment, the supply and discharge of pressure oil to and from the secondary actuator 47 are effected by the manual oil pressure switching valve 37 which is directly switched by the gearshift. Due to this, the correction of the gear ratio by the secondary actuator 47 is effected quickly and in an ensured manner. In addition, since the switching of the secondary actuator 47 is not (electrically) effected based on a detection signal of the gearshift position or gear selection position detection sensor such as a position switch 34 (refer to FIG. 15), even in case the position sensor 34 fails, the correction of the gear ratio can be effected in an ensured fashion, and hence the reliability can also be increased.

In addition, in the case of the embodiment, the gear ratio of the toroidal type continuously variable transmission 4 is adjusted to the GN value when the vehicle is stopped and the gearshift is shifted in the non-running state (P range, N range) whereby the secondary actuator 47 is located at the neutral position. Namely, in such a state that the vehicle is stopped and the gear ratio of the toroidal type continuously variable transmission is not yet corrected by the secondary actuator 47, the speed ratio of the continuously variable transmission system is adjusted to the GN position in FIG. 3. However, the speed ratio of the continuously variable transmission system can be set to a position deviating from the GN position, for example, a position γ (a position where a forward driving force can be generated from the output shaft 14) in FIG. 3 in such a state that the vehicle is stopped and the secondary actuator 47 is located at the neutral position. Since the setting like this can easily be made by shifting the correlation between the number of steps of the stepping motor 29 and the gear ratio of the toroidal type continuously variable transmission 4 (and hence the speed ratio of the continuously variable transmission system) when the secondary actuator 47 is located at the neutral position.

As this occurs, when the gearshift is operated from the non-running state to the forward position to which the gearshift is operated highly frequently, the variation amount (correction amount) of the gear ratio of the toroidal type continuously variable transmission 4 can be reduced. In other words, the drive amount of the secondary actuator 47 (the displacement of the spool 49 from the neutral position) can be reduced when the gearshift is operated to the forward position, whereby an increase in stabilization of the gear ratio correcting motion can be accomplished. In addition, as has been described above, in the event that the gear ratio of the toroidal type continuously variable transmission is set to the value, at which the forward driving force can be generated from the output shaft 14 in such a state that the secondary actuator 47 is located at the neutral position, even in a case where the stepping motor 29 fails in this state, it also becomes possible to make the vehicle run on its own to a safety place such as an edge of the road by engaging the low-speed clutch 15 based on the operation of the gearshift.

Embodiment 2

Figure 4:
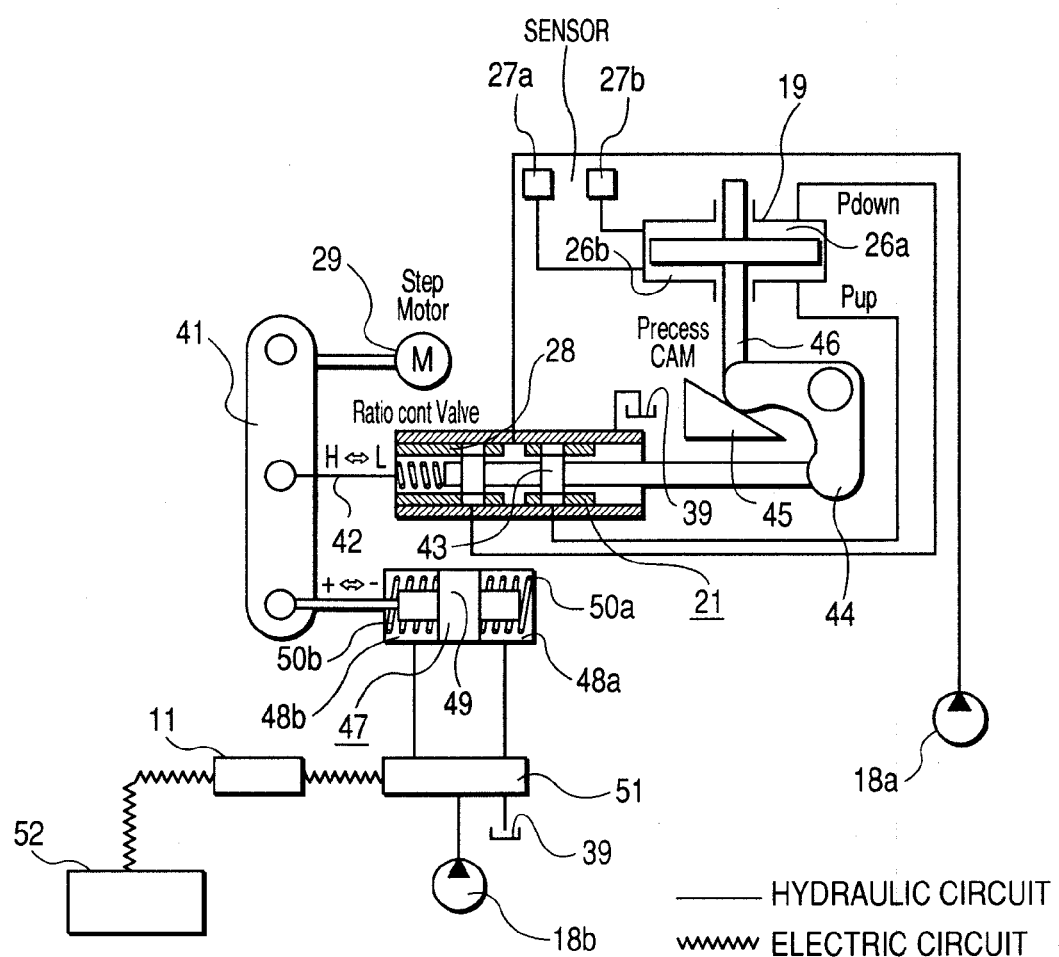
FIG. 4 is a diagram showing a control unit according to Embodiment 2 of the invention as being taken out of the whole hydraulic circuit thereof.

FIG. 4 shows Embodiment 2 of the invention which corresponds to the first to third, tenth to thirteenth, sixteenth and seventeenth aspects of the invention. In the case of this embodiment, the supply and discharge of pressure oil to a secondary actuator 47 are effected by an electromagnetic or solenoid valve 51 which is an electric switching valve that is controlled by a control unit 11. In addition, the switching of this solenoid valve 51 is effected based on a detection signal of a gearshift position detection sensor 52 for detecting a gear selection position of a gearshift. Additionally, in addition to the detection signal of this gearshift position detection sensor 52, a detection signal of a brake switch 36 (refer to FIG. 15) for detecting the depression of a brake pedal is used. Note that in the case of the embodiment, the solenoid valve 51 corresponds to the tertiary switching valve.

Figure 15:
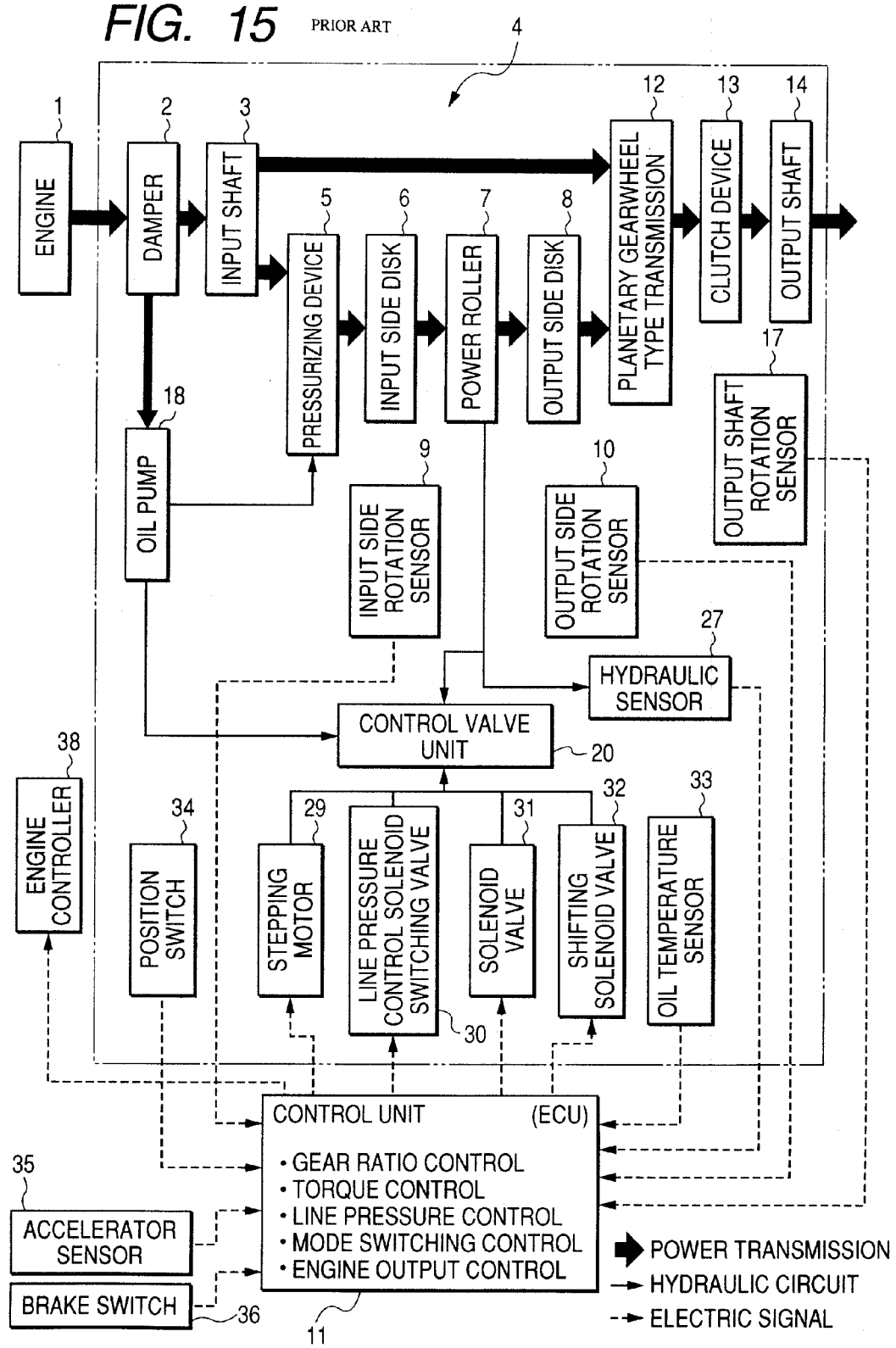
FIG. 15 is a block diagram showing a conventional continuously variable transmission system.

In the case of the embodiment described above, when the gearshift is operated from a non-running state to a running state, the solenoid valve 51 is activated by the control unit 11 so as to correct a gear ratio of a toroidal type continuously variable transmission 4 (refer to FIG. 15). In addition to this, a low-speed clutch 15 (refer to FIG. 1) is engaged in a state that the gear ratio of the toroidal type continuously variable transmission 4 is completely corrected. For example, the control unit 11 is given a function to activate the solenoid valve 51 (to correct the gear ratio) before pressure oil is sent into the low-speed clutch 15 based on the operation of the gearshift so that the low-speed clutch 15 starts to transmit power.

In addition, the solenoid valve 51 is preferably activated (the gear ratio is corrected) only when a vehicle is determined to be stopped or run at extremely low speed by detecting the running speed of the vehicle from an output shaft rotation sensor 17 (refer to FIG. 15) for detecting the rotational speed of an output shaft 14. In this case, the same correction of the gear ratio as occurring when the vehicle starts from the rest state is designed not to be effected when the gearshift is once operated to the non-running state (N range) and is then operated back to the running state (D range) while running (at high speed).

According to the above-described embodiment, the gear ratio control (the correction of the gear ratio) of the toroidal type continuously variable transmission 4 (refer to FIG. 5) can be effected minutely by the solenoid valve 51. In association with this, an oil communication path can be omitted, thereby making it possible to make small (compact) in size a valve body which incorporates therein a hydraulic circuit.

In addition, when the solenoid valve 51 is switched using a detection signal of the brake switch 36, the secondary actuator 47 can be activated (the gear ratio can be corrected) on a condition where the depression of the brake pedal is released. In addition, as this occurs, the gear ratio of the toroidal type continuously variable transmission 4 is to be corrected after the low-speed clutch 15 is engaged so that the low-speed clutch 15 is made ready for transmission of power. In this case, however, the durability of the toroidal type continuously variable transmission 4 can be increased due to a reduction in torque that passes through the toroidal type continuously variable transmission 4 in such a state that the brake pedal is depressed.

In addition, although not shown, in place of the aforesaid secondary hydraulic actuator 47, an electric actuator (for example, a direct-action actuator that is electrically controlled) may be used as the secondary actuator which constitutes the secondary driving member. In this case, this secondary actuator is made to be activated (directly by the control unit 11) based on a detection signal of the gearshift position detection sensor 52 for detecting the gear selection position of the gearshift. By adopting this configuration, the hydraulic circuit can be simplified further, increasing the degree of freedom in design.

The other configurations and function of this embodiment are similar to those of Embodiment 1, and hence, the repetition of the similar description will be omitted here.

Embodiment 3

Figure 5:
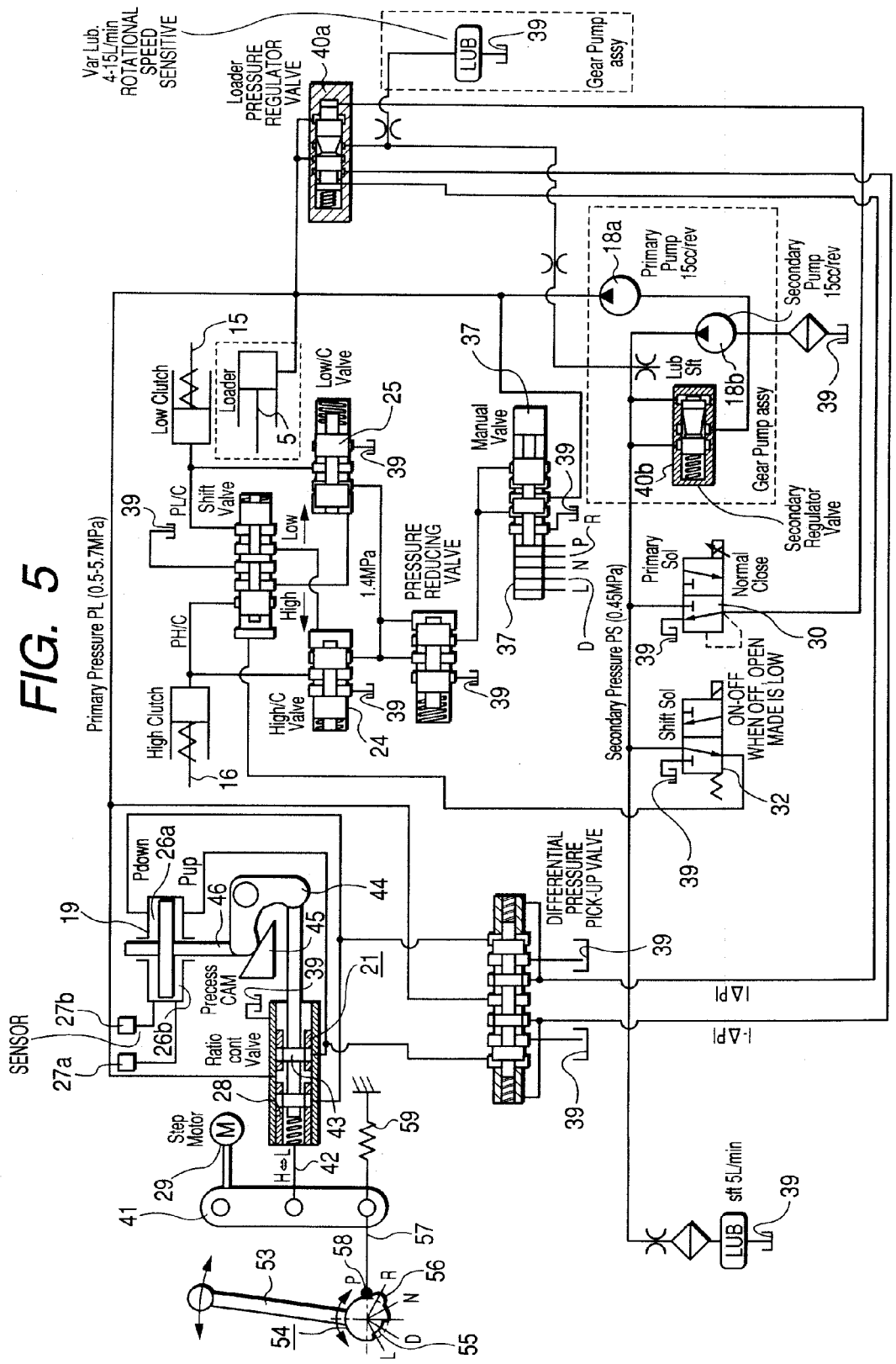
FIG. 5 is a hydraulic circuit diagram similar to FIG. 1 which shows Embodiment 3 of the invention.

FIG. 5 shows Embodiment 3 of the invention which corresponds to the first to third, tenth, fifteenth, sixteenth and seventeenth aspects of the invention. According to the configuration of Embodiment 1 that has been described before, the secondary actuator 47 (refer to FIG. 1) is activated based on the switching of the manual oil pressure switching valve 37 that is operated by the gearshift so as to displace the sleeve 28 of the gear ratio control valve 21 to thereby correct the gear ratio of the toroidal type continuously variable transmission 4. In contrast to this, in the case of this embodiment, the movement of a gearshift 53 is made to be transmitted directly to a link arm 41 connected to a sleeve 28 of a rear ratio control valve 21, so as to correct the gear ratio of a toroidal type continuously variable transmission 4 (refer to FIG. 15).

Due to this, in the event of the embodiment, a swing plate 54 such as a detent plate making up a detent mechanism is provided at a proximal end portion of the gearshift 53 concentrically with a swing center of the gearshift as a member that is displaced based on the movement of the gearshift 53. The swing plate 54 like this has a recessed portion 55 and a raised portion 56 which are formed on an outer circumferential surface thereof in such a manner as to be recessed radially inwards from the outer circumferential surface and to project radially outwards therefrom, respectively. A spherical portion 58 such as a detent ball which similarly makes up the detent mechanism is provided at a distal end portion of a connecting arm 57 which is supported on an end portion of the link arm 41 at a proximal end portion thereof, and this spherical portion 58 is brought into abutment with the outer circumferential surface of the swing plate 54. In addition, an elastic member 59 such as a compression coil spring is provided on the link arm 41 at an opposite end portion to the portion where the connecting arm 57 is supported for imparting an elastic force in a direction in which the spherical portion 58 is pressed towards the outer circumferential surface of the swing plate 54.

In the case of the embodiment that is configured as described above, when the gearshift 53 is operated, the swing plate 54 swings about a fulcrum a together with the gearshift 53. For example, when the gearshift 53 is operated from a parking position (P range) or a neutral position (N range) which is a non-running state to a reverse position (R range) which is a running state, the spherical portion 58 provided at the distal end portion of the connecting arm 57 rides on the raised portion 56 against the elastic force of the elastic member 59. Then, the connecting arm 57 is displaced axially in one direction (to the right in FIG. 5) from a neutral position based on the riding of the spherical portion 58 on the raised portion 56, and in association with this, the link arm 41 swings on an engagement portion with a stepping motor 29 as a fulcrum in a direction which displaces the sleeve 28 of the gear ratio control valve 21 axially in one direction, whereby the gear ratio of the toroidal type continuously variable transmission 4 is corrected by a predetermined amount. Note that the predetermined amount, by which the gear ratio of the toroidal type continuously variable transmission 4 is corrected based on the swing of the link arm 41 in the way described above, is made to be an amount which corresponds to an amount which changes a speed ratio of a continuously variable transmission system from a GN position (a G/N point, point O) to a position β, as was described in Embodiment 1 while referring to FIG. 3. In addition, the projecting amount of the raised portion 56 is controlled such that the predetermined amount is allowed to be such an amount.

On the contrary, when the gearshift 53 is operated from the parking position (P range) or the neutral position (N range) which is the non-running state to a forward position (D range) or a high driving force forward position (L range) which is the running state, the spherical portion 58 provided at the distal end portion of the connecting arm 57 is brought into engagement with the recessed portion 55 (falls in the recessed portion 55) based on the elastic force of the elastic member 59. Then, the connecting arm 57 is displaced axially in the other direction (to the left in FIG. 5) from the neutral position based on the engagement. Then, in association with the displacement of the connecting arm 57, the link arm 41 swings on the engagement portion with the stepping motor 29 as the fulcrum in a direction which displaces the sleeve 28 of the gear ratio control valve 21 axially in the other direction. Thus, the gear ratio of the toroidal type continuously variable transmission 4 is corrected by a predetermined amount. Note that the predetermined amount, by which the gear ratio of the toroidal type continuously variable transmission 4 is corrected based on the swing of the link arm 41 in the way described above, is made to be an amount which corresponds to an amount which changes a speed ratio of a continuously variable transmission system from a GN position (a G/N point, point O) to a position α, as was described in Embodiment 1 while referring to FIG. 3. In addition, the recessed amount of the recessed portion 55 is controlled such that the predetermined amount is allowed to be such an amount.

In the case of the embodiment described above, neither hydraulic circuit nor electric circuit is required, and the correction of the gear ratio of the toroidal type continuously variable transmission 4 can be effected mechanically. Due to this, the system can be simplified in configuration and can be made difficult to fail. In addition, a slippage on timing (a delay) is made difficult to occur between the operation timing of the gearshift 53 and a timing when the gear ratio is actually corrected.

The other configurations and function of this embodiment are similar to those of Embodiment 1, and hence, the repetition of the similar description will be omitted here.

Embodiment 4

Figure 6:
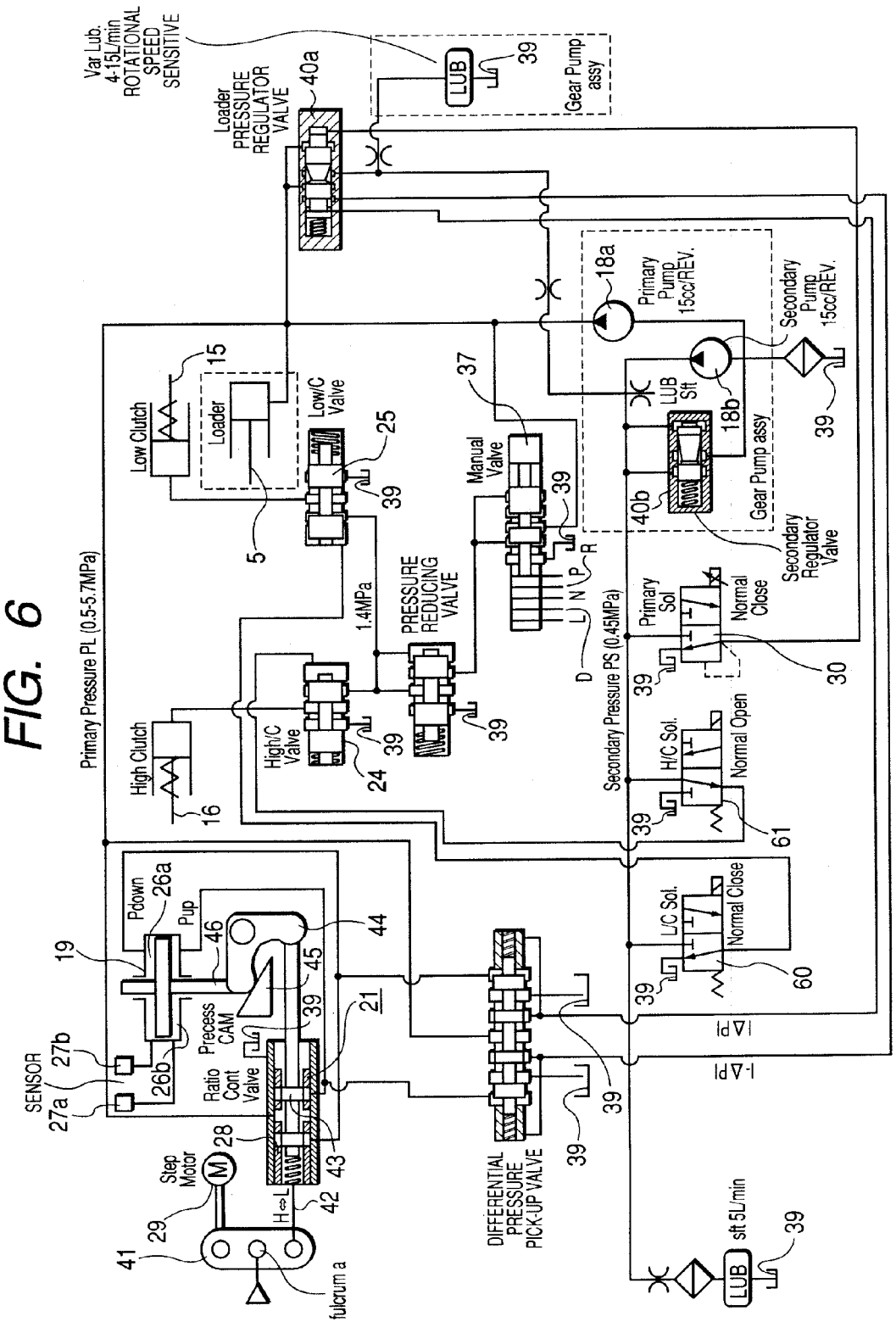
FIG. 6 is a hydraulic circuit diagram similar to FIG. 1 which shows Embodiment 4 of the invention.
Figure 16:
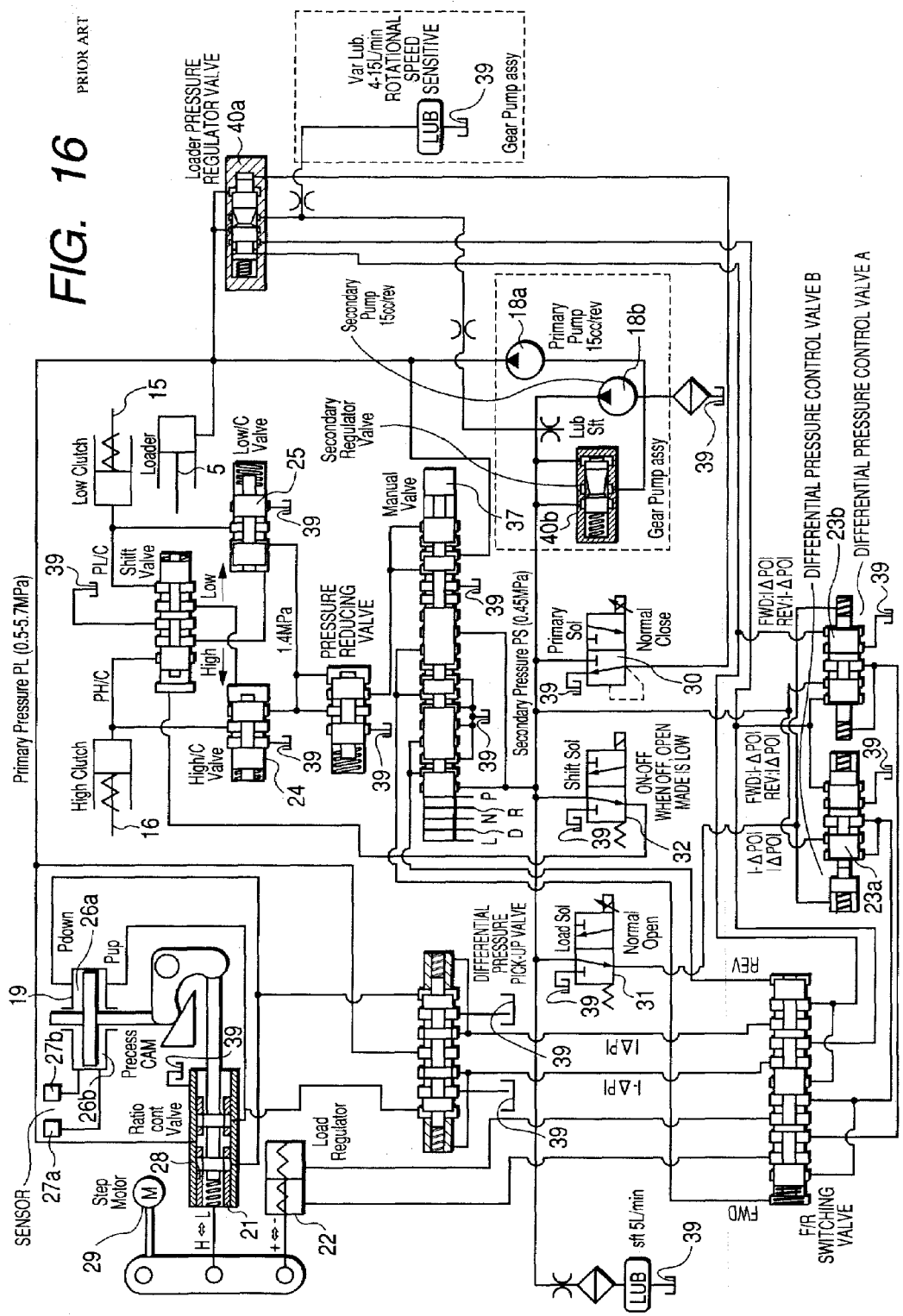
FIG. 16 is a hydraulic circuit diagram that is built in the continuously variable transmission system.

FIG. 6 shows Embodiment 4 of the invention which corresponds to the first to third, seventh, ninth and seventeenth aspects of the invention. In the case of Embodiments 1 to 3 that have been described heretofore, in addition to the primary driving member such as the stepping motor 29, the secondary driving member such as the secondary hydraulic actuator 47 (Embodiments 1 to 2) and the swing plate 54 (Embodiment 3) is provided, whereby the sleeve 28 of the gear ratio control valve 21 is displaced by the secondary driving member, so as to correct the gear ratio of the toroidal type continuously variable transmission 4 (refer to FIG. 15). In contrast to this configuration, according to this embodiment, the normal gear ratio control and the correction of the gear ratio when a gearshift is operated from a non-running state to a running state are effected only by a stepping motor 29. In the case of the embodiment configured like this, neither the secondary driving member (the secondary actuator 47, the swing plate 54) nor the driving member such as the differential cylinder 22 which is described in the constructions described in the JP-A-2004-225888 and illustrated in FIG. 16 is provided.

Namely, in the case of this embodiment, a distal end portion of an output portion of the stepping motor 29 and a distal end portion of a rod 42, which is connected to the sleeve 28 at a proximal end portion thereof, are locked on both end portions a link arm 41. In addition to this, an intermediate portion of the link arm 41 is supported on a stationary portion such as a valve body in such a manner as to freely swing. In the case of this embodiment configured like this, when the driving member (the rod) of the stepping motor 29 is displaced axially based on a signal of a control unit 11, the link arm 41 swings about a fulcrum a. Then, the sleeve 28 is displaced axially based on the swing, and the gear ratio of the toroidal type continuously variable transmission 4 is changed.

In addition, in the case of this embodiment, the engagement and disengagement of low-speed and high-speed clutches 15, 16 are made free to be switched over or selected by low-speed and high-speed clutch solenoid switching valves 60, 61 which correspond to the secondary switching valve. Namely, these low-speed clutch and high-speed clutch solenoid switching valves 60, 61 are such as to displace spools, respectively, based on the energization of solenoids, and the switching state of high-speed and low-speed switching valves 24, 25 for switching pressure oil to be introduced into the low-speed and high-speed clutches 15, 16 is switched based on the displacement of the spools. Then, the engagement and disengagement of the low-speed and high-speed clutches 15, 16 are effected by switching the introducing state of pressure oil into hydraulic chambers of the low-speed and high-speed clutches 15, 16 based on the switching of the high-speed and low-speed switching valves 24, 25.

For example, when the low-speed clutch 15 is engaged while the engagement of the high-speed clutch 16 is released, both the low-speed clutch and the high-speed clutch solenoid switching valves 60, 61 are de-energized, and the respective spools of the solenoid switching valves 60, 61 are displaced to the right as viewed in FIG. 1 by virtue of elastic force of springs. Then, based on the displacement of the spools, a pilot chamber of the low-speed switching valve 25 is made to communicate with an oil reservoir 39, and pressure oil is introduced into a pilot chamber of the high-speed switching valve 24. As a result, a spool of the low-speed switching valve 25 is displaced to the left as viewed in FIG. 1 based on elastic force of a spring, and pressure oil is introduced into the hydraulic chamber of the low-speed clutch 15, whereby the low-speed clutch 15 is engaged. In addition, a spool of the high-speed switching valve 24 is made to be displaced to the left as viewed in FIG. 1 against elastic force of a spring, and the hydraulic changer of the high-speed clutch 16 is made to communicate with the oil reservoir 39, and the engagement of the high-speed clutch 16 is released.

In contrast, when the engagement of the low-speed clutch 15 is released, while the high-speed clutch 16 is engaged, both the low-speed clutch and the high-speed clutch solenoid switching valves 60, 61 are energized, and the respective spools of the solenoid switching valves 60, 61 are displaced to the left as viewed in FIG. 1 against the elastic force of the springs. Then, based on the displacement of the spools, pressure oil is introduced into the pilot chamber of the low-speed switching valve 25, while the pilot chamber of the high-speed switching valve 24 is made to communicate with the oil reservoir 39. As a result, the spool of the low-speed switching valve 25 is made to be displaced to the right as viewed in FIG. 1 against the elastic force of the spring, and the hydraulic chamber of the low-speed clutch 15 is made to communicate with the oil reservoir 39, whereby the engagement of the low-speed clutch 15 is released. In addition, the spool of the high-speed switching valve 24 is displaced to the right as viewed in FIG. 1, and pressure oil is introduced into the hydraulic chamber of the high-speed clutch 16, whereby the high-speed clutch 16 is engaged.

Additionally, when the engagement of both the low-speed and high-speed clutches 15, 16 is released, the low-speed clutch solenoid switching valve 60 is energized, and the spool of the solenoid switching valve 60 is made to be displaced to the left as viewed in FIG. 1 against the elastic force of the spring, while the high-speed clutch solenoid switching valve 61 is de-energized, and the spool of this solenoid switching valve 61 is displaced to the right as viewed in FIG. 1 based on the elastic force of the spring. Then, based on the displacement of the spools, pressure oil is introduced into the respective pilot chambers of both the high-speed and low-speed switching valves 24, 25. As a result, the spool of the low-speed switching valve 25 is displaced to the right as viewed in FIG. 1 against the elastic force of the spring, and the hydraulic chamber of the low-speed clutch 15 is made to communicate with the oil reservoir 39, whereby the engagement of the high-speed clutch 16 is released.

In the case of the embodiment like this, when the gearshift is operated from a parking position (P range) or a neutral position (N range) which is a non-running state to a forward range (D range) or a high driving force forward position (L range), or a reverse position (R range) which is a running stage in a state where a vehicle is stopped, the gear ratio of the toroidal type continuously variable transmission 4 is corrected by a predetermined amount based on the drive of the stepping motor 29. Namely, when the gearshift is shifted in the P, N range in such a state that the vehicle is stopped, the gear ratio of the toroidal type continuously variable transmission 4 is adjusted to a GN value which is a value at which a state can be realized where an output shaft 14 can be stopped with an input shaft 3 (refer to FIG. 15) kept rotating in one direction in such a state that no load is applied to the output shaft 14. Then, when the gearshift is operated from this state to the D, L, R range, the low-speed clutch 15 is engaged based on the operation of the gearshift. In the case of this embodiment, the gear ratio of the toroidal type continuously variable transmission 4 is corrected from the GN value by a predetermined amount based on the drive of the stepping motor 29 before the low-speed clutch 15 is engaged so that the low-speed clutch 15 is made ready for transmission of power.

Due to this, in the event of this embodiment, the control unit 11 (refer to FIG. 15) for controlling the switching state of the low-speed clutch and high-speed clutch solenoid switching valves 60, 61 is imparted a function to de-energize the low-speed clutch and high-speed clutch solenoid switching valves 60, 61 so as to engage the low-speed clutch 15 on a condition that the gear ratio of the toroidal type continuously variable transmission 4 is corrected by the predetermined amount. To describe more specifically, the operation of the gearshift from the P, N range to the D, L, R range by means of, for example, a position switch 34 (refer to FIG. 15) or a gearshift position detection sensor 52 (refer to FIG. 4) for detecting the movement of the gearshift. Then, the control unit 11 activates the stepping motor 29 based on a detection signal from the switch 34 or the sensor 52 so as to correct the gear ratio of the toroidal type continuously variable transmission 4. On the other hand, the control unit 11 determines whether or not the gear ratio of the toroidal type continuously variable transmission has been corrected by the predetermined amount, for example, by seeing whether or not the step position of the stepping motor 29 has been driven to a position corresponding to the relevant gear ratio (the gear ratio corrected by the predetermined amount) or by calculating a gear ratio from a rotational speed of an input disk 6 and a rotational speed of an output disk 8 (refer to FIG. 15). Then, having determined that the gear ratio has been corrected by the predetermined amount, the low-speed clutch and high-speed clutch solenoid switching valves 60, 61 are de-energized based on a signal from the control unit 11, so as to engage the low-speed clutch 15.

The predetermined amount, by which the gear ratio of the toroidal type continuously variable transmission 4 is corrected when the gearshift is operated from the non-running state to the running state as has been described above, is made to be an amount which corresponds to an amount at which the speed ratio of the continuously variable transmission system is displace from the GN position (G/N point, point O) to the position a or the position β as was described in Embodiment 1 by reference to FIG. 3. Then, the driving amount of the stepping motor 29 is set such that the predetermined amount becomes such an amount. Note that the stepping motor 29 is preferably driven (the gear ratio is corrected) based on the operation of the gearshift only when the vehicle is determined to be stopped or to run at extremely low speed from a running speed of the vehicle that is detected from an output shaft rotation sensor 17 (refer to FIG. 15) for detecting the rotational speed of the output shaft 14. By adopting the configuration like this, it is possible to design that the same gear ratio correction as when starting the vehicle from the rest state does not take place when the gearshift is thereafter shifted from the non-running state back to the running state (D range) or the like.

In the case of this embodiment configured like this, since the secondary driving member such as the secondary hydraulic actuator 47 for correcting the gear ratio of the toroidal type continuously variable transmission 4 is not provided separately from the primary driving member such as the stepping motor 29, the hydraulic circuit or the like can be configured in a simple fashion. In addition, the differential pressure cylinder 22 (refer to FIG 16) does not have to be provided for performing the gear ratio control for adjusting the torque passing through the toroidal type continuously variable transmission 4, which is the construction described in the JP-A-2004-225888 and JP-A-2004-308853. Due to this, the construction of the control unit can be simplified which is adapted to control the gear ratio of the toroidal type continuously variable transmission 4.

Note that while in this embodiment, the engagement and disengagement of the low-speed clutch 15 and the high-speed clutch 16 are described as being effected via the high-speed and low-speed switching valves 24, 25, these switching valves 24, 25 can be omitted, so that the switching of pressure oil that is to be sent into the hydraulic chambers of the low-speed and high-speed clutches 15, 16 can be effected directly by the low-speed clutch and high-speed clutch solenoid switching valves 60, 61.

The other configurations and function of this embodiment are similar to those of Embodiments 1 to 3 that have been described before, the repetition of the same description thereof will be omitted here.

Embodiment 5

Figure 7:
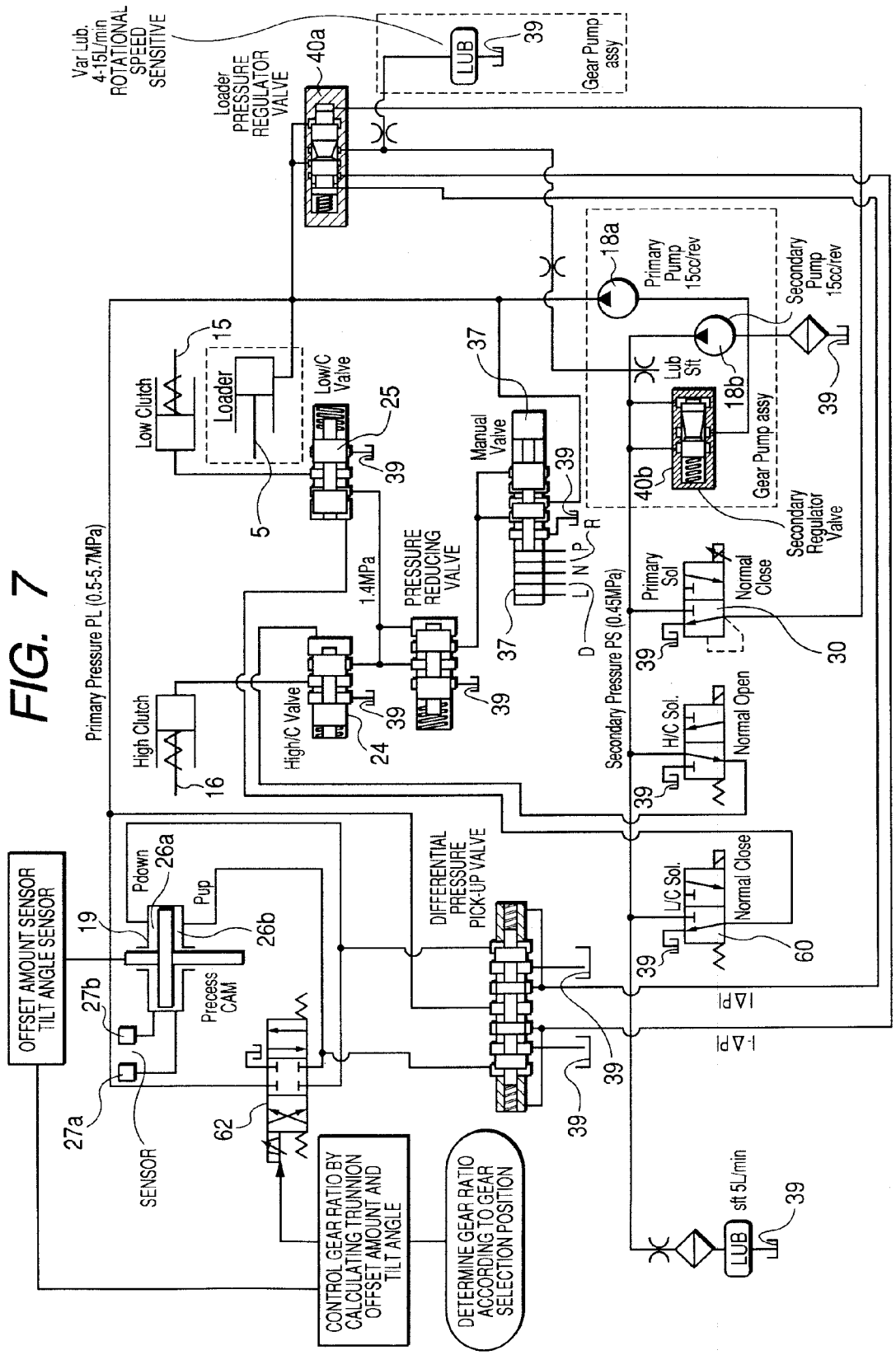
FIG. 7 is a hydraulic circuit diagram similar to FIG. 1 which shows Embodiment 5 of the invention.

FIG. 7 shows Embodiment 5 of the invention which corresponds to the first to third, seventh to ninth, and seventeenth aspects of the invention. In the case of Embodiment 4 that has just been described above, the gear ratio of the toroidal type continuously variable transmission 4 (refer to FIG. 15) is configured so as to be adjusted by switching the supply and discharge of pressure oil to and from the actuator 19 for displacing the support members such as the trunnions which rotatably supports the power rollers 7 (refer to FIG. 15), respectively. In contrast to this, in the case of this embodiment, the supply and discharge of pressure oil to and from the actuator 19 is directly switched by changing the switching state of a primary electric switching valve 62, so as to adjust the gear ratio of the toroidal type continuously variable transmission 4. Namely, in the case of this embodiment, the offset amount (displacement from a neutral position) of the support members (the trunnions) and the tilt amount (swing amount) of the power rollers 7 are detected, the switching state of the primary electric switching valve 62 such as a solenoid proportional valve or a servo valve is changed according to the detected offset amount and tilt amount and the gear selection position of the gearshift, whereby the gear ratio of the toroidal type continuously variable transmission 4 is adjusted. Note that since the method for controlling the gear ratio of a toroidal type continuously variable transmission using the offset amount and tilt amount as described above is conventionally known in the above-described "Toroidal CVT" written by Hirohisa Tanaka and published by Kabushiki Kaisha Corona on Jul. 13, 2000, and the like, a detailed description thereof will be omitted here.

Also in the case of the embodiment configured as described above, when the gearshift is operated from the non-running state to the running-state, the gear ratio of a toroidal type continuously variable transmission 4 is corrected by a predetermined amount. As this occurs, the gear ratio of the toroidal type continuously variable transmission 4 is corrected by the predetermined amount before the engagement of a low-speed clutch 15 is effected based on the operation of the gearshift so that the low-speed clutch 15 is made ready for transmission of power. Due to this, for example, a control unit 11 (refer to FIG. 15) for controlling the switching state of the primary electric switching valve 62 and the engagement and disengagement of the low-speed clutch 15 and a high-speed clutch 16 is given a function to correct the gear ratio by switching the primary electric switching valve 62 before pressure oil is sent into the low-speed clutch 15 based on the operation of the gearshift so that the low-speed clutch 15 is made ready for transmission of power. In addition, the control unit 11 can also be imparted a function to determine whether or not the gear ratio of the toroidal type continuously variable transmission 4 has been corrected by the predetermined amount from. For example, the rotational speed of an input disk 6 and the rotational speed of an output disk 8 (refer to FIG. 15) and de-energize the low-speed clutch and high-speed clutch solenoid switching valves 60, 61 so as to engage the low-speed clutch 15 in such a state that the gear ratio is completely corrected.

In either of the cases, the predetermined amount by which the gear ratio of the toroidal type continuously variable transmission 4 is corrected when the gearshift is operated from the non-running state to the running state is made to be an amount which corresponds to an amount at which the speed ratio of the continuously variable transmission system is displace from the GN position (G/N point, point O) to the position α or the position β as was described in Embodiment 1 by reference to FIG. 3. Then, the operation amount of the primary switching valve 62 is set such that the predetermined amount becomes such an amount. Note that the primary switching valve 62 is preferably driven (the gear ratio is corrected) based on the operation of gearshift only when the vehicle is determined to be stopped or to run at extremely low speed from a running speed of the vehicle that is detected from an output shaft rotation sensor 17 (refer to FIG. 15) for detecting the rotational speed of the output shaft 14. By adopting the configuration like this, it is possible to design that the same gear ratio correction as when starting the vehicle from the rest state does not take place when the gearshift is thereafter shifted from the non-running state back to the running state (D range) or the like. In addition, the aforesaid gear ratio correction can be effected based on information on the depression and release of the brake pedal that is obtained a brake switch 36 (refer to FIG. 15), as required.

In the case of the embodiment configured like this, since the supply state of pressure oil to the actuator 19 is directly switched over without involving the gear ratio control valve 21 (for example, refer to FIG. 1) used in the constructions illustrated in Embodiments 1 to 4 which have been described before, a slippage on timing (a delay) between the timing when the gearshift is performed and the timing when the actuator 19 is operated can be made to take place. In addition to this, the feedback mechanism for feeding back the tilt of the power rollers 7 to the gear ratio control valve 21 can also be omitted, and hence, the construction of the system can also be simplified.

Embodiment 6

Figure 8:
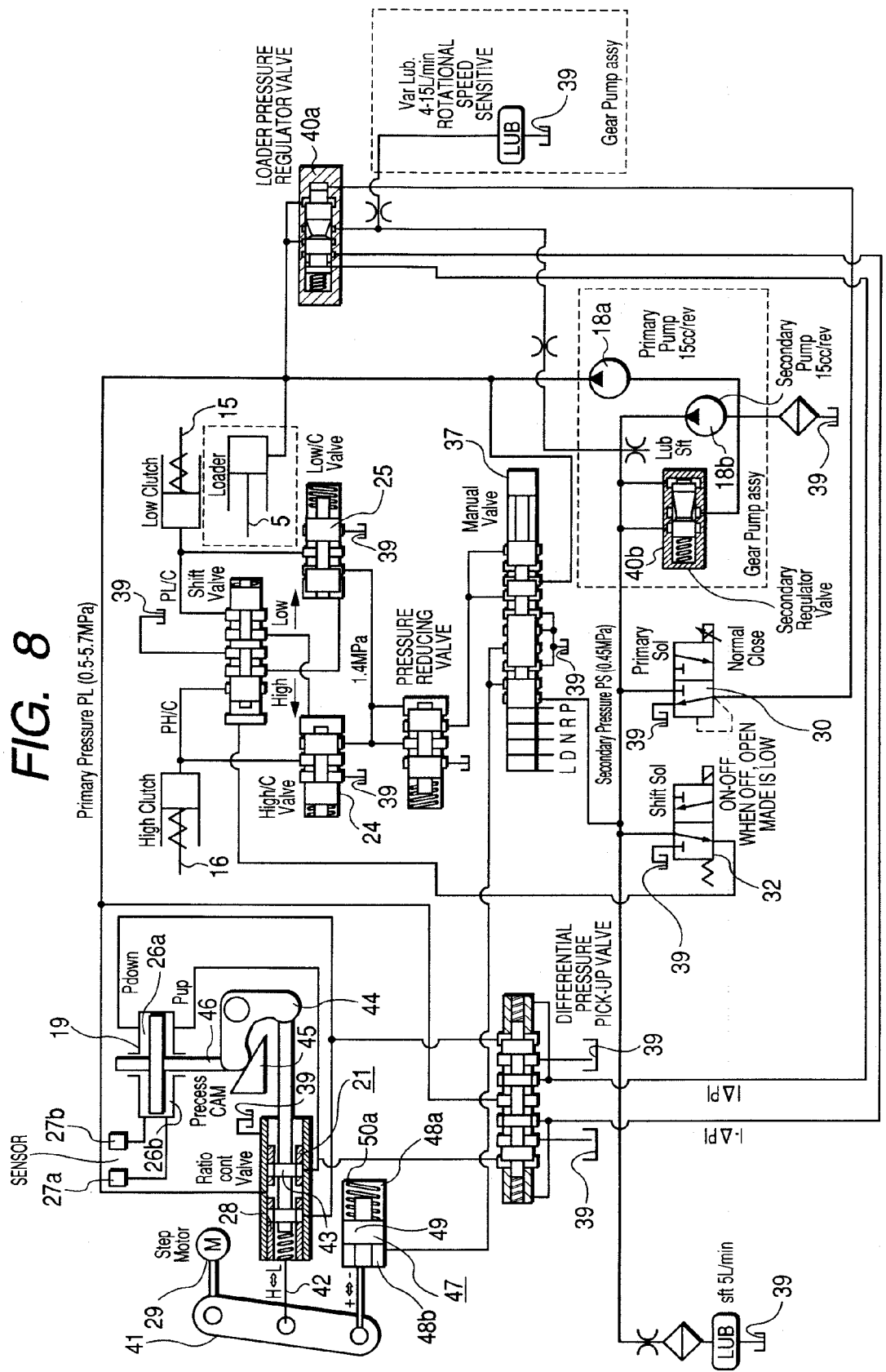
FIG. 8 is a hydraulic circuit diagram similar to FIG. 1 which shows Embodiment 6 of the invention.

FIG. 8 shows Embodiment 6 of the invention which corresponds to the first to sixth, tenth to twelfth, sixteenth and seventeenth aspects of the invention. In the case of this embodiment, a construction is adopted where the other spring 50b (the left spring in FIGS. 1, 8) of the pair of springs 50a, 50b which make up the secondary actuator 47 used in the construction of Embodiment 1 is omitted (only the spring 50a is provided). In association with the change in construction, the oil path for sending pressure oil into the hydraulic chamber 48a (the right one in FIGS. 1, 8) of the pair of hydraulic chambers 48a, 48b which make up the secondary actuator 47 can also be omitted, and the construction of the manual oil pressure switching valve 37 can be simplified and made smaller in size compared to the construction of Embodiment 1. In the case of the embodiment configured like this, the supply and discharge of pressure oil to and from the (other) hydraulic chamber 48b provided in the manual oil pressure switching valve 37 is made free to be switched over according to a position to which the manual oil pressure switching valve 37 is switched.

Namely, in the case of this embodiment, when the gearshift is operated to the parking position (P range), the neutral position (N range), the forward position (D, L range), the hydraulic chamber 48b is made to communicate with an oil reservoir 39 based on the switching of the manual oil pressure switching valve 37, and pressure oil in the hydraulic chamber 48b is discharged. As a result, the spool 49 of the secondary actuator 47 is displaced axially in the other direction (to the left in FIG. 8) based on the elastic force of the spring 50a. Then, based on the displacement of the spool 49, a link arm 41 swings on an engagement portion with a stepping motor 29 as a fulcrum in a direction which displaces a sleeve 28 of a gear ratio control valve 21 from a neutral position axially in the other direction, whereby the gear ratio of a toroidal type continuously variable transmission 4 (refer to FIG. 15) is corrected by a predetermined amount.

On the contrary, the gearshift is operated to the reverse position (R range), based on the switching of the manual oil pressure switching valve 37, pressure oil is supplied to the other hydraulic chamber 48b. As a result, the spool 49 of the secondary actuator 47 is displaced axially in one direction (to the right in FIG. 8) so as to be against the elastic force of the spring 50a based on the supply of pressure oil to the other hydraulic chamber 48a. Then, based on the displacement of the spool 49, the link arm 41 swings on the engagement portion with the stepping motor 29 as the fulcrum in a direction which displaces the sleeve 28 of the gear ratio control valve 21 axially in one direction, whereby the gear ratio of the toroidal type continuously variable transmission 4 is corrected by the predetermined amount.

Figure 9:
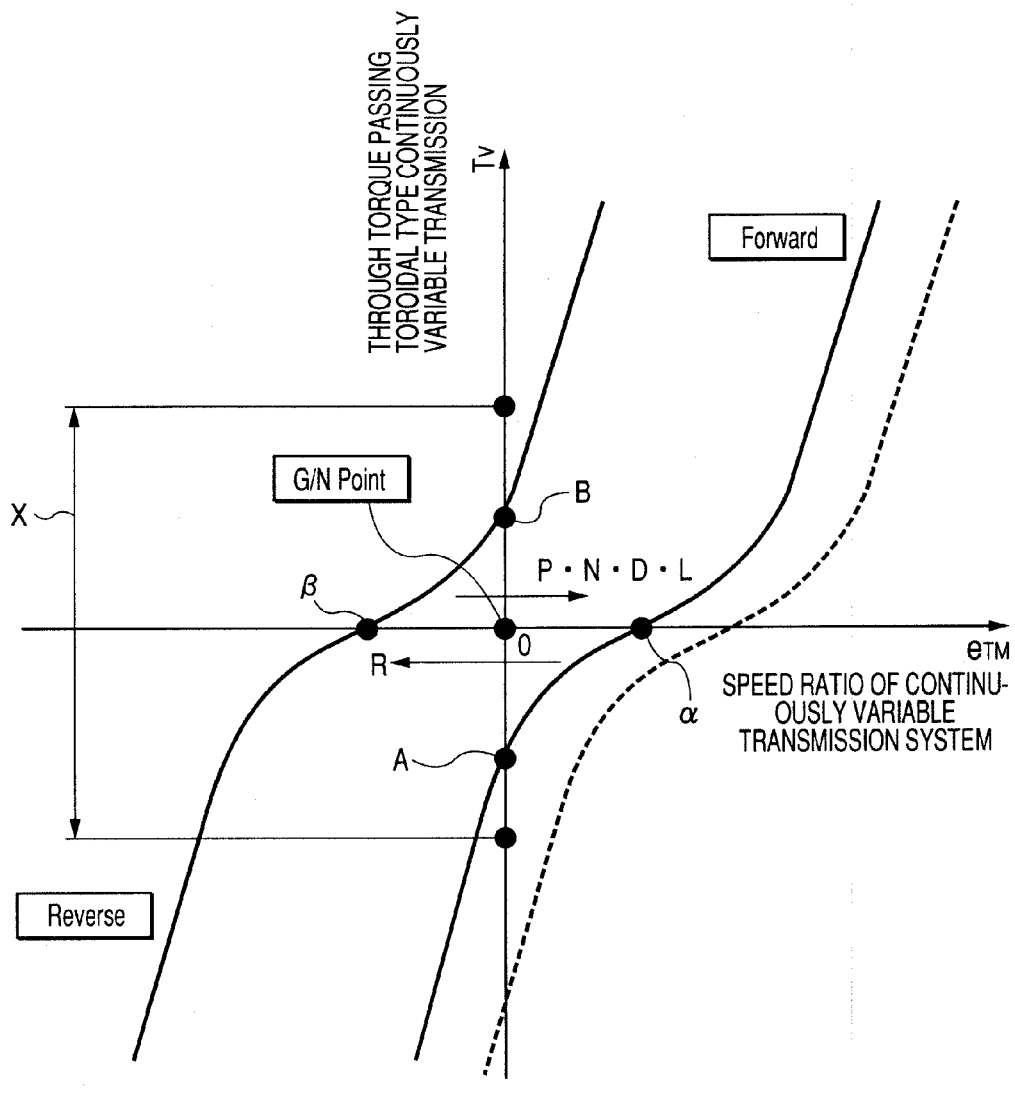
FIG. 9 is an explanatory diagram which explains a correction amount of the gear ratio of the toroidal type continuously variable transmission.

In the case of the embodiment configured like this, even when the gearshift is shifted in the N, P range, as in the case where the gearshift is operated to the D, L range, a state results where the gear ratio of the toroidal type continuously variable transmission 4 is corrected from a GN value by the predetermined amount. Namely, in Embodiment 1 that has been described before, the spool 49 making up the secondary actuator 47 lies at the neutral position in such a state that the gearshift is shifted in the P, N range. In this state, the gear ratio of the toroidal type continuously variable transmission 4 is adjusted to the GN value which is the value at which the output shaft 14 (refer to FIG. 15) of the continuously variable transmission system is stopped with the input shaft 3 kept rotating in one direction even in such a state that the large load based on braking or the like is not applied to the output shaft 14. In contrast to this, in the case of the embodiment, even when the gearshift is shifted in the P, N range, as in the case where the gearshift is operated to the D range or L range, a state results where the spool 49 making up the secondary actuator 47 is completely displaced axially to the other direction as shown in FIG. 8. In this state, as shown in FIG. 9, the gear ratio of the toroidal type continuously variable transmission 4 is adjusted (corrected) such that the speed ratio of the continuously variable transmission system comes to lie in a position α in such a state that no load is applied to the output shaft 14 of the continuously variable transmission system and a torque passing through the toroidal type continuously variable transmission 4 comes to lie in a position A in such a state that a large load based on braking or is applied to the output shaft 14 of the continuously variable transmission system.

On the contrary, when the gearshift is operated to the R range, a state results where the spool 49 making up the secondary actuator 47 is completely displaced in an opposite way to the state shown in FIG. 8 that is, axially in one direction based on the supply of pressure oil into the other hydraulic chamber 48b. In this state, similarly as shown in FIG. 9, the gear ratio of the toroidal type continuously variable transmission 4 is adjusted (corrected) such that the gear ratio of the continuously variable transmission system comes to lie in a position β in such a state that no load is applied to the output shaft 14 of the continuously variable transmission system and the torque passing through the toroidal type continuously variable transmission 4 comes to lie in a position B in such a state that the large load based on braking or the like is applied to the output shaft 14 of the continuously variable transmission system.

Thus, in the case of the embodiment, with the gearshift shifted in the P, N range which is the non-running state, the gear ratio of the toroidal type continuously variable transmission is corrected to the value at which a driving force corresponding to the forward position is generated from the output shaft 14 based on the operation of the secondary actuator 47 (That is, the correction is completely corrected from the GN value to the full extent of the predetermined amount). Due to this, when the gearshift is operated to the forward position to which the gearshift is operated highly frequently, the gear ratio of the toroidal type continuously variable transmission does not have to be corrected (the gear ratio may be kept corrected to the value corresponding to the forward position). In other words, only by simply engaging the low-speed clutch 15, a driving force needed in the forward direction can be outputted from the output shaft 14 momentarily. Due to this, when the gearshift is operated to the forward position to which the gearshift is operated highly frequently, the operation for changing the gear ratio becomes unnecessary, an increase in stabilization of the gear ratio correcting operation can be accomplished.

In addition, in the event that the gear ratio of the toroidal type continuously variable transmission 4 is corrected in advance to the value corresponding to the forward position as has been described above, even in case the stepping motor 29 for displacing the sleeve 28 of the gear ratio controlling valve 21 fails in this state, it also becomes possible to make the vehicle run on its own to a safety place such as an edge of the road by engaging the low-speed clutch 15 based on the operation of the gearshift.

On the contrary, when the gearshift is operated from the P, N range to the reverse position, pressure oil is momentarily supplied into the hydraulic chamber 48b of the secondary actuator 47 based on the switching of the manual oil pressure switching valve 37. Due to this, the low-speed clutch 15 is engaged (that is, the low-speed clutch 15 is made ready for transmission of power) in such a state that the gear ratio of the toroidal type continuously variable transmission 4 is corrected to a value corresponding to the reverse position based on the displacement of the spool 49 of the secondary actuator 47. Consequently, also when the gearshift is operated to the reverse position, a driving force needed in the reverse direction can be outputted from the output shaft 14.

Figure 10:
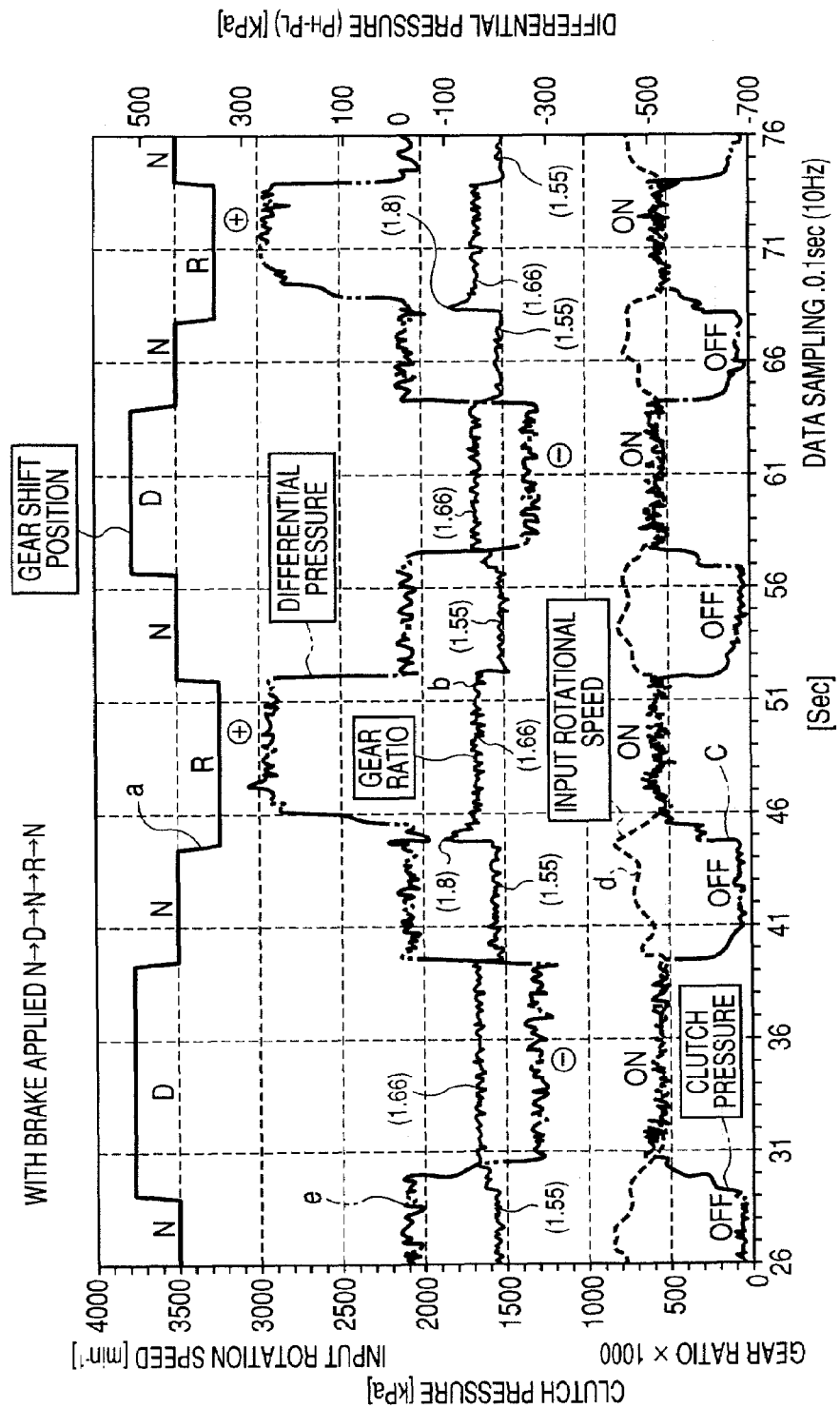
FIG. 10 is a diagram which explains states of individual constituent portions which result when the gearshift is operated in such a state that a brake pedal is depressed.

FIG. 10 shows a relationship of the gear ratio (×1000) of the toroidal type continuously variable transmission 4, oil pressure [KPa] in the hydraulic chamber and input rotational speed [min$^{-1}$] of the low-speed clutch 15 and a differential pressure between a pair of hydraulic chambers 26a, 26b of the actuator 19 which results when the gearshift is repeatedly operated in such a way; N range->D range->N range->R range->N range in such a state that the brake pedal is depressed. In FIG. 10, a thick line indicated by a denotes the positions to which the gearshift was operated, a thin line indicated by b the gear ratio, an alternate long and short dash line indicated by c denotes the oil pressure of the low-speed clutch 15, a broken line indicated by d denotes the input rotational speed and a chain double-dashed line indicated by e denotes the differential pressure. Note that the input rotational speed is the rotational speed of an input disk 6 and is a value equal to the rotational speed of an engine 1 (refer to FIG. 15) which constitutes a driving source. In addition, the differential pressure constitutes a value which is proportional to the magnitude of torque passing through the toroidal type continuously variable transmission 4 (through torque) and hence driving force (driving torque, creeping force) outputted from the output shaft 14 (refer to FIG. 15).

In addition, when the gearshift is shifted in the D range, the gear ratio of the toroidal type continuously variable transmission 4 is corrected to a value which deviates from the GN value (1.66) based on the drive of the secondary actuator 47 (through the displacement of the spool 49 to the left in FIG. 8). To be specific, the gear ratio is corrected to a value (1.55) at which a state can be realized where the output shaft 14 can be stopped with the input shaft 3 kept rotating based on the torque shift without stopping the engine 1 in such a state that the brake pedal is depressed and the driving force needed in the forward direction can be obtained from the output shaft 14 in such a state that the depression of the brake pedal is released. In addition, also when the gearshift is shifted in the P, N position which is not-running state, the gear ratio is corrected to the value (1.55) as in the case where the gearshift is shifted in the D range based on the drive of the secondary actuator 47 through the displacement of the spool 49 to the left in FIG. 8.

In contrast, when the gearshift is shifted in the R range, the gear ratio of the toroidal type continuously variable transmission 4 is corrected to a value which deviates from the GN value based on the drive of the secondary actuator 47 through the displacement of the spool 49 to the right in FIG. 8. To be specific, the gear ratio is corrected to a value (1.8) at which a state can be realized where the output shaft 14 can be stopped with the input shaft 3 kept rotating based on a torque shift occurring without stopping the engine 1 in such a state that the brake pedal is depressed and the driving force needed in the reverse direction can be obtained from the output shaft 11 in such a state that the depression of the brake pedal is released.

For example, when the gearshift is shifted in the N range, since the engagement of the low-speed clutch 15 and the high-speed clutch 16 is released, there is generated a differential pressure between the hydraulic chambers 26a, 26b of the actuator 19 while maintaining the torque passing through the toroidal type continuously variable transmission 4 at 0. In addition, in association with this, the gear ratio is maintained at 1.55 which is the value corrected from the GN value based on the drive of the secondary actuator 47. When the gearshift is operated to the D range from this state, the oil pressure in the hydraulic chamber of the low-speed clutch 15 rises, and the low-speed clutch 15 is engaged. In this state, since the output shaft 14 is stopped based on the depression of the brake pedal, the gear ratio moves to 1.66 which is the GN value based on the torque shift (speed increases), and the through torque increases based on a torque shift occurring, whereby a negative differential pressure is produced between the hydraulic chambers 26a, 26b of the actuator 19. When the depression of the brake pedal is released in this state, a driving force needed in the forward direction is produced from the output shaft 14.

In addition, when the gearshift is operated from the aforesaid D range to the N range, the oil pressure of the low-speed clutch 15 decreases, and the engagement of the low-speed clutch 15 is released. As a result, the differential pressure between the hydraulic chambers 26a, 26b of the actuator 19 becomes 0, and the gear ratio returns to 1.55 which is the value corrected from the GN value as has been described above. In addition, when the gearshift is operated from the aforesaid N range to the R range, the gear ratio is momentarily corrected to 1.8 which is the value corresponding to the reverse direction based on the drive of the secondary actuator 47. However, even though the gear ratio is corrected to 1.8 like this, since the output shaft 14 remains stopped due to the depression of the brake pedal, the oil pressure in the hydraulic chamber of the low-speed clutch 15 rises, then, the low-speed clutch 15 is engaged, and the gear ratio moves (decreases) to 1.66 which is the GN value based on a torque shift occurring. In addition, in association with this, the through torque increases based on the torque shift, and hence, a positive differential pressure is produced between the hydraulic chambers 26a, 26b of the actuator 19. When the depression of the brake pedal is released in this state, a driving force needed in the reverse direction is produced from the output shaft 14.

As is clear from FIG. 10 which shows what has been described above, paying attention to the torque passing through the toroidal type continuously variable transmission 4 or the differential pressure between the hydraulic chambers 26a, 26b of the actuator 19, it is seen that the differential pressure changes to the negative value with the gearshift shifted in the D range and to the positive value with the gearshift in the R range. Namely, since positive and negative reverse when the gearshift lies in the D range and R range, it is seen that the forward or reverse driving force can be produced in an ensured fashion according to the operation of the gearshift. In addition, in the case of this embodiment, while the GN value is 1.66 and the gear ratio resulting in such a state that it is corrected based on the operation of the secondary actuator 47 when the gearshift is shifted in the N range and D range is 1.55, the variation amount of the gear ratio between the GN value and the corrected value corresponds to the tilt amount (the swing amount) of the power rollers 7 which is a variation amount of the order of 3 degrees (on the order of 5% of total gear ratio width). In addition, a driving force which somehow equals the creeping force outputted from the conventional vehicular automatic transmission is designed to be outputted by correcting the gear ratio to 1.55 in such a state that the gearshift is shifted in the D range. Note that the closer the gear ratio is made to approach 1.66 which is the GN value, the smaller the driving force produced from the output shaft 14 becomes, whereas the further the gear ratio is made to separate from the GN value, the larger the driving force outputted from the output shaft 14 becomes. Consequently, by adjusting the gear ratio in such a state that the gearshift is shifted in the D range (the corrected state), it is also possible to adjust the driving force (the creeping force) outputted from the output shaft 14 to, for example, the feeling of the driver. Thus, the function to adjust the driving force is specific to the continuously variable transmission system.

Figure 11:
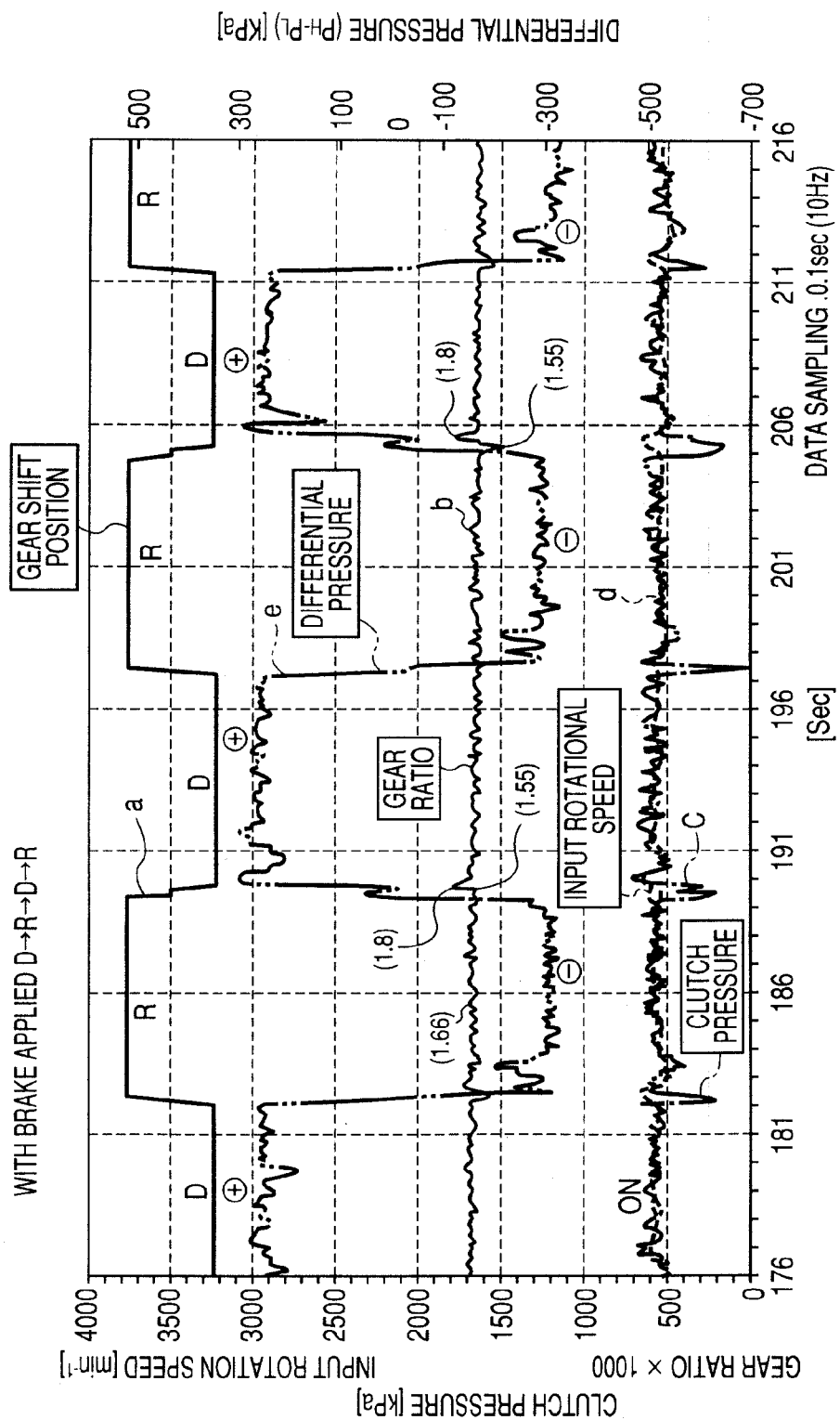
FIG. 11 is a diagram similar to FIG. 10 which shows the same as shown in FIG. 10 but with a different operation order of the gearshift.

In addition, similar to the diagram shown in FIG. 10 that has just been described above, FIG. 11 shows a similar relationship resulting when the gearshift is repeatedly operated with the brake pedal depressed in the following way: D range->R range->D range->R range. It is seen from FIG. 11 showing such a relationship that the torque passing through the toroidal type continuously variable transmission, that is, the differential pressure between the hydraulic chambers 26a, 26b of the actuator 19 reverses momentarily. Due to this, the forward or reverse driving force can be produced in an ensured fashion according to the operation of the gearshift.

The other configurations and function of this embodiment are similar to those of Embodiment 1, and hence, the repetition of the similar description thereof will be omitted here.

Embodiment 7

Figure 12:
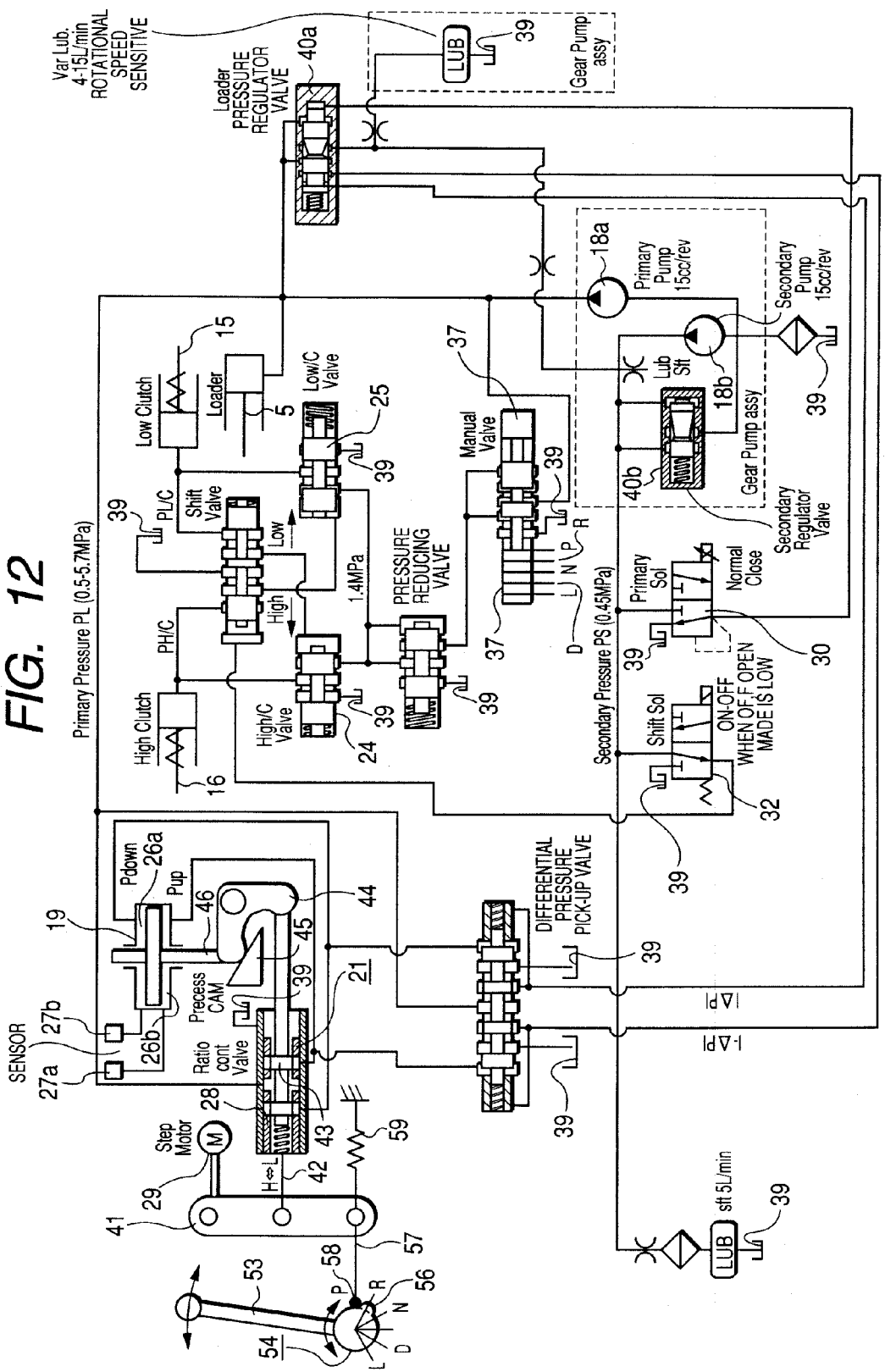
FIG. 12 is a hydraulic circuit diagram similar to FIG. 1 which shows Embodiment 7 of the invention.

FIG. 12 shows Embodiment 7 which corresponds to the first to sixth, tenth, fifteenth, sixteenth and seventeenth aspects of the invention. In the case of Embodiment 6 that has just been described above, the gear ratio of the toroidal type continuously variable transmission 4 (refer to FIG. 15) is configured so as to be corrected by displacing the sleeve 28 of the gear ratio control valve 21 through the operation of the secondary actuator 47 based on the switching the manual oil pressure switching valve 37 which is operated by the gearshift. In contrast to this, in the case of this embodiment, as with Embodiment 3 which has been described before by reference to FIG. 5, the sleeve 28 of the gear ratio control valve 21 is made to be displaced by a swing plate 54 provided on a gearshift 53, so as to correct the gear ratio of the toroidal type continuously variable transmission 4.

In the case of the embodiment configured as described above, only a raised portion 56 is provided on an outer circumferential surface of the swing plate 54 at a position corresponding to the R range, and the recessed portion 55 (refer to FIG. 5), which was provided in Embodiment 3, is not provided at the position corresponding to the D, L range. In the case of the embodiment like this, the gear ratio of the toroidal type continuously variable transmission 4 is, as with Embodiment 6, adjusted (corrected) to a value (for example, 1.55) at which the speed ratio of the continuously variable transmission system comes to lie in the position a in FIG. 9 (the torque passing through the toroidal type continuously variable transmission 4 comes to lie in the position A in such a state that a large load based on braking or the like is applied) in such a state that the gearshift is shifted to lie in P, N, D, L range. In contrast, when the gearshift lies in the R range, a spherical portion 58 of a connecting arm 57 rides on the raised portion 56 of the swing plate 54, whereby a link arm 41 swings on an engagement point with a stepping motor 29, so as to displace the sleeve 28 of the gear ratio control valve 21 to the right in FIG. 8. Then, the gear ratio of the toroidal type continuously variable transmission 4 is, as with Embodiment 6 that has just been described above, adjusted (corrected) based on the displacement of the sleeve 28 to a value (for example, 1.8) at which the speed ratio of the continuously variable transmission system comes to lie in the position β in FIG. 9. That is, the torque passing through the toroidal type continuously variable transmission 4 comes to lie in the position B in such a state that a large load based on braking or the like is applied.

The other configurations and function of this embodiment are similar to those of Embodiments 4 and 6, and hence, the repetition of the similar description thereof will be omitted here.

Embodiment 8

Figure 13:
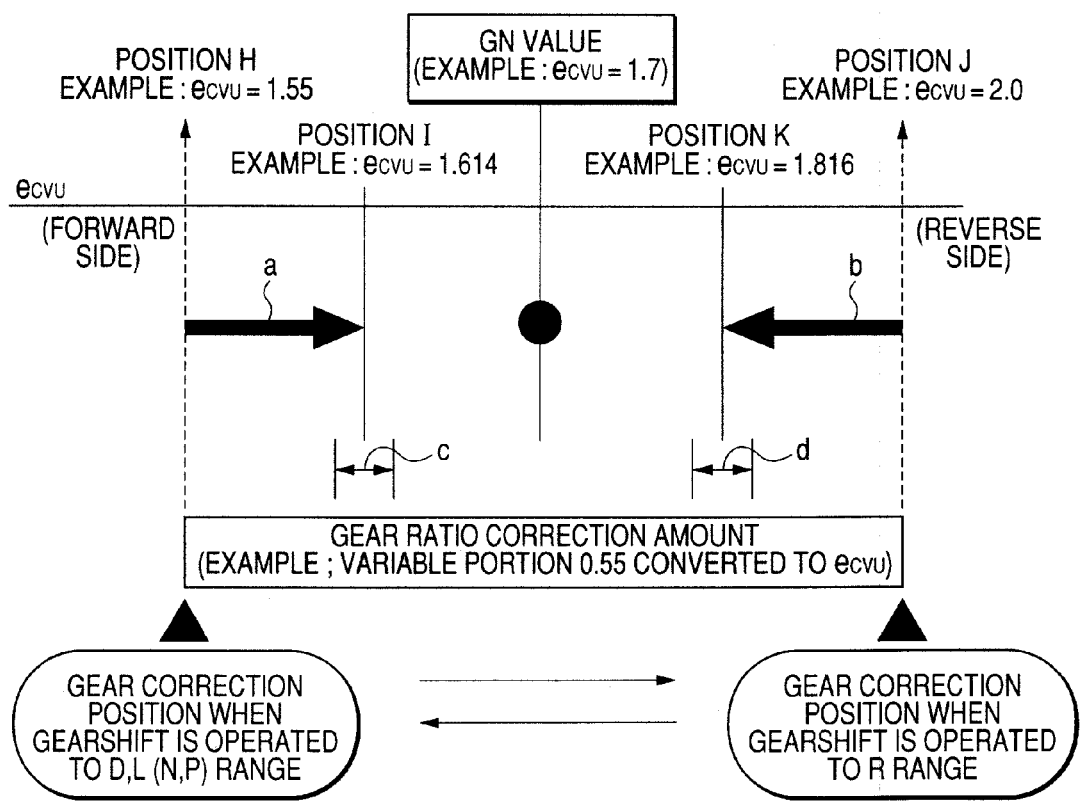
FIG. 13 is a diagram which explains a characteristic gear ratio correction of Embodiment 8.
Figure 14:
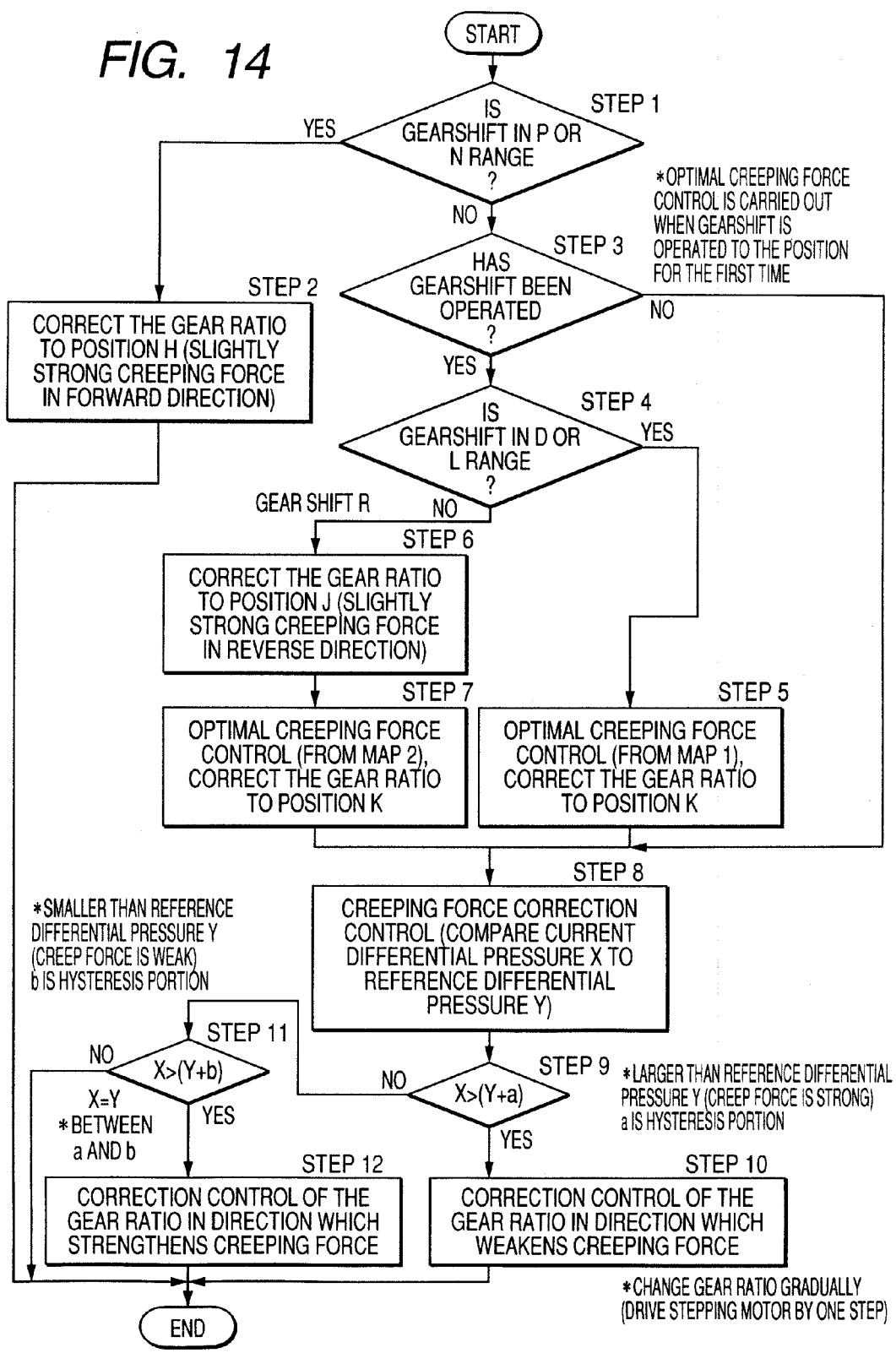
FIG. 14 is a flowchart showing a characteristic operation.

FIGS. 13 to 14 show Embodiment 8 which corresponds to the first to thirtieth aspects of the invention. In the case of Embodiments 1 to 7 that have been described heretofore, the gear ratio of the toroidal type continuously variable transmission 4 is corrected by the predetermined amount based on the operation of the gearshift before the low-speed clutch 15 (refer to FIGS. 1, 16 and the like) which makes up the clutch device 13 (refer to FIG. 15) is engaged so that the low-speed clutch 15 is made ready for transmission of power. To describe more specifically, when the gearshift is operated to D, L range (to P, N, D, L range in the case of Embodiments 6, 7), the gear ratio is corrected to the value (a position H in FIG. 13 and for example, 1.55) at which the speed ratio of the continuously variable transmission system comes to lie in the position α in FIG. 3 or 9 (the torque passing through the toroidal type continuously variable transmission 4 comes to lie in the position A in such a state that the large load based on braking or the like is applied to the output shaft (refer to FIG. 15). In addition, when the gearshift is operated to the R range, the gear ratio is corrected to the value (a position J in FIG. 13 and for example, 2.0) at which the speed ratio of the continuously variable transmission system comes to lie in the position β in FIG. 3 or 9 (the torque passing through the toroidal type continuously variable transmission 4 comes to lie in the position B in such a state that the large load based on braking or the like is applied to the output shaft 14). In contrast to this, in the case of the embodiment, after the gear ratio is corrected to the position H or position J, the gear ratio is corrected further from the position H or position J.

Namely, in the case of this embodiment, the gear ratio of the toroidal type continuously variable transmission 4 is corrected to the position H or position J, which constitutes a primary correction value, before the low-speed clutch 15 is made ready for transmission of power. Thereafter, whether or not the low-speed clutch 15 has been made ready for transmission of power (preferably, before the low-speed clutch 15 is made ready for transmission of power), the gear ratio is corrected from the primary correction value to a position I or position K which is a secondary correction value. For example, when the gearshift is operated to D, L (P, N) range, before the low-speed clutch 15 is made ready for transmission of power, the gear ratio of the toroidal type continuously variable transmission 4 is corrected to the primary correction value (the position H) which corresponds to a forward direction. Thereafter, the gear ratio is corrected from the primary correction value to the second value (the position I) which similarly corresponds to the forward direction, whether or not the low-speed clutch 15 has been made ready for transmission of power. On the other hand, when the gearshift is operated to the R range, before the low-speed clutch 15 is made ready for transmission of power, the gear ratio of the toroidal type continuously variable transmission 4 is corrected to the first correction position (the position J) Thereafter, the gear ratio is corrected from the primary correction value to the secondary correction value (the position K) which similarly corresponds to the reverse direction, whether or not the low-speed clutch 15 has been made ready for transmission of power.

In the case of this embodiment, as indicated by arrows a, b in FIG. 13, the gear ratio of the toroidal type continuously variable transmission 4 is corrected from the position H or position J which is the primary correction value in a direction which approaches a GN value (GN point) (torque passing through the toroidal type continuously variable transmission 4 decreases). To be specific, the primary correction value (the position H or position J) is made to be a value at which a driving force (driving torque) which somehow enables the vehicle to start from the rest state and run at low speed in a direction corresponding to the position to which the gearshift is operated can be outputted from the output shaft 14 in an ensured fashion (a value at which a slightly strong creeping force in the traveling direction can be outputted). In addition, the secondary correction value (the position I or position K) is made to be a value at which a driving force, which is smaller than the driving force that is outputted in such a state that the gear ratio is corrected to the primary correction value, can be outputted from the output shaft 14 (a value at which a creeping force which is smaller than the slightly strong creeping force can be outputted). In addition, as will be described later on, this secondary correction value is made to be a value at which an optimal driving force can be outputted from the output shaft 14 which optimal driving force is to be determined according to a state amount (for example, the temperature of lubricating oil (traction oil) residing therein or the like) which affects a driving force to be outputted. In addition, the primary correction values (the positions H, J) and the secondary correction values (the positions I, K) are set within a range (the range X in FIGS. 3, 9) in which a state can be realized without stopping the engine 1 (refer to FIG. 15) where when a large load is applied to the output shaft 14 with the input shaft 3 kept rotating in one direction, the output shaft 14 can be stopped with the input shaft 3 kept rotating in one direction based on a torque shift occurring.

In addition, in order to correct the gear ratio from the primary correction value to the secondary correction value as has been described above, in the case of the embodiment, the gear selection position of the gearshift is made free to detected by a gearshift position detection sensor. As the gearshift position detection sensor like this, for example, the gearshift position detection sensor 52 (FIG. 4) used in Embodiment 2 which has been described before and the position sensor 34 (FIG. 15) having the conventional construction which has also been described before can be used. In either of the cases, the operation of the gearshift to the forward position (D, L range) or the reverse position (R range) is detected by the gearshift position detection sensor for detecting the gear selection position of the gearshift, and the gear ratio is corrected from the primary correction value (the position H or position J) to the secondary correction value (the position I or position K) based on a detection signal of the gearshift position detection sensor. In the case of the embodiment, as will be described next, a control unit 11 (refer to FIG. 15) for controlling a stepping motor 29 (FIG. 1 and the like) and a primary switching valve 62 (FIG. 7) is imparted a function to correct the gear ratio from the primary correction value to the secondary correction value according to the detection signal of the gearshift position detection sensor in the way described above.

For example, in the case of the construction shown in Embodiments 1, 2, 6 (FIGS. 1, 4, 8) which have been described above, when the gearshift is operated, the secondary actuator 47 is switched over based on the operation of the gearshift, so that the gear ratio of the toroidal type continuously variable transmission 4 is corrected to the primary correction value. In addition, in association with this, the operation of the gearshift is detected by the gearshift position detection sensor. Then, based on a detection signal of the gearshift position detection sensor, the stepping motor 29 is driven by the control unit 11, so that the gear ratio is corrected from the primary correction value to the secondary correction value. Additionally, in the case of Embodiments 3, 7 (FIGS. 5, 12), when the gearshift 53 is operated, the swing plate 54 swings together with the gearshift 53, so that the gear ratio of the toroidal type continuously variable transmission 4 is corrected to the primary correction value. In addition, in association with this, the operation of the gearshift 53 is detected by the gearshift position detection sensor. Then, based on a detection signal of the gearshift position detection sensor, the stepping motor 29 is driven by the control unit 11, so that the gear ratio is corrected from the primary correction value to the secondary correction value.

On the other hand, in the case of the constructions shown in Embodiment 4 (FIG. 6) and Embodiment 5 (FIG. 7), when the gearshift is operated, the stepping motor 29 is driven (in the case of Embodiment 4) or the switching state of the primary electric switching valve 62 is changed (Embodiment 5) based on a detection signal of the gearshift position detection sensor (the drive and change are activated by the control unit 11), so that the gear ratio of the toroidal type continuously variable transmission 4 is corrected to the primary correction value. Then, after the gear ratio of the toroidal type continuously variable transmission 4 has been corrected to the first control value in the way described above, the stepping motor 29 is driven further, or the switching state of the primary switching valve 62 is changed further, the gear ratio is corrected from the primary correction value to the second correction. Note that the correction of the gear ratio to the primary correction value can be determined, for example, by seeing whether or not the step position of the stepping motor 29 has been driven to the position corresponding to the primary correction value or whether or not the gear ratio that is calculated from the rotational speeds of the input side and output disks 6, 8 (refer to FIG. 15) has become the primary correction value.

In addition, as has been described above, the secondary correction value is made to be the value at which the optimal driving force can be outputted from the output shaft in which optimal driving force is determined according to the state value which affects a driving force to be outputted. In the case of this embodiment, the state amount is the temperature (oil temperature) of the lubricating oil (traction oil) residing therein, and the gear ratio is corrected from the primary correction value to the second correction value which is determined by the oil temperature available then based on relationships shown in Tables 1, 2 below. Note that Table 1 below shows a relationship between the oil temperature and the correction amount (variation amount) of the gear ratio from the primary correction value and the drive mount (the number of steps) of the stepping motor 29 which corresponds to the correction amount, when the gearshift is operated to the D range. In addition, Table 2 below shows a similar relationship between the oil temperature and the correction amount of the gear ratio and the drive amount, when the gearshift is operated to the R range. In addition, correlations like these are stored in a memory or the like of the control unit 11 in the form of, for example, a map in advance, so that the gear ratio is corrected from the primary correction value to the secondary correction value corresponding to the oil temperature available then.

TABLE 1

| Oil temperature [C. °] | Number of Steps of Stepping Motor | Change-speed Amount (Gear Ratio) |
|---|---|---|
| +150 | 8 | 0.032 |
| +125 | 9 | 0.036 |
| +100 | 11 | 0.044 |
| +75 | 12 | 0.048 |
| +50 | 13 | 0.052 |
| +25 | 16 | 0.064 |
| 0 | 16 | 0.064 |
| −25 | 17 | 0.068 |
| −50 | 17 | 0.068 |

TABLE 2

| Oil temperature [C. °] | Number of Steps of Stepping Motor | Change-speed Amount (Gear Ratio) |
|---|---|---|
| +150 | 28 | 0.112 |
| +125 | 32 | 0.128 |
| +100 | 35 | 0.140 |
| +75 | 40 | 0.160 |
| +50 | 43 | 0.172 |
| +25 | 46 | 0.184 |
| 0 | 46 | 0.184 |
| −25 | 48 | 0.192 |
| −50 | 50 | 0.200 |

As an example, a case will be described where the continuously variable transmission system is set, for example, as shown in FIG. 13: the GN value is 1.7, the primary correction value corresponding to the forward direction when the gearshift is operated to D, L (P, N) range is 1.55, and the primary correction value corresponding to the reverse direction when the gearshift is operated to the R range is 2.0. Note that $e_{CVU}$ in FIG. 13 denotes the gear ratio of the toroidal continuously variable transmission 4. As an example, considering a state where the continuously variable transmission which is set as described above is being operated at an oil temperature of +25 degrees. In this case, when the gearshift is operated to D, L (P, N) range, so that the gear ratio is corrected to the primary correction value (1.55), based on the correlation shown in Table 1 above, the stepping motor 29 is driven 16 steps, whereby the gear ratio is corrected from the primary correction value (1.55) to 1.614 which is the secondary correction value. On the contrary, when the gearshift is operated to the R range, so that the gear ratio is corrected to the primary correction value (2.0), based on the correlation shown in Table 2 above, the stepping motor 29 is driven 46 steps, whereby the gear ratio is corrected from the primary correction value (2.0) to 1.816 which is the secondary correction value.

In the case of this embodiment, after the gear ratio has been corrected to the secondary correction value in the way described above, the gear ratio so corrected is adjusted (corrected) further within a range indicated by arrows c, d. Namely, after the gear ratio has been corrected to the secondary correction value in the way described above, an actual driving force (driving torque, creeping force) that is actually outputted from the output shaft 14 is obtained, and the gear ratio of the toroidal type continuously variable transmission 4 is corrected further according to the actual driving force so obtained. To describe more specifically, the actual driving force is obtained based on the differential pressure between a pair of hydraulic chambers 26a, 26b (refer to FIG. 1) which make up an actuator 19 which is a value which is proportional to the torque passing through the toroidal type continuously variable transmission 4, so that the gear ratio of the toroidal type continuously variable transmission 4 is corrected according to the differential pressure. Note that the gear ratio correction effected according to the differential pressure between the hydraulic chambers 26a, 26b of the actuator 19 in the way described above is to be so effected on condition that a state results where the low-speed clutch 15 is engaged (so that the low-speed clutch 15 is made ready for transmission of power) and the torque passing through the toroidal type continuously variable transmission 4 and hence the driving force outputted from the output shaft 14 can be detected as the differential pressure between the hydraulic chambers 26a, 26b.

The correction of the gear ratio that is effected based on the differential pressure in the way described above will be carried out as below. Namely, a differential pressure corresponding to a driving force which constitutes a reference, that is, a differential pressure corresponding to an optimal driving force to be outputted is obtained in advance and is stored in the memory of the control unit 11. Then, while comparing the differential pressure corresponding to the optical driving force which is stored in the memory to the actual differential pressure, the gear ratio of the toroidal type continuously variable transmission 4 is corrected (for example, by driving the stepping motor 29 step by step). For example, in the event that the actual differential pressure is larger than the differential pressure corresponding to the optimal driving force, the torque (through torque) passing through the toroidal type continuously variable transmission 4 and hence the driving force (creeping force) which is outputted from the output shaft 14 is determined to be larger than the optimal value. In this case, the gear ratio of the toroidal type continuously variable transmission 4 is corrected in a direction which decreases the differential pressure (through torque, driving force). On the contrary to this, in the event that the differential pressure is smaller than the differential pressure corresponding to the optimal driving force available then, the gear ratio of the toroidal type continuously variable transmission 4 is corrected in a direction which increases the differential pressure (through torque, driving force). In addition, in the event that the differential pressure coincides with the differential pressure corresponding to the optimal driving force available then, the gear ratio is then maintained at the existing value. Thus, by continuing to correct the gear ratio based on the differential pressure corresponding to the actual driving force in the way described above, the state can be maintained where the optimal driving force can be outputted from the output shaft 14.

The function given to the control unit 11 will be described by reference to a flowchart shown in FIG. 14 which works when the gear ratio is corrected from the primary correction value to the secondary correction value in the way described above and is then corrected (adjusted) further based on the differential pressure corresponding to the actual driving force in the way described above. Note that an operation illustrated in the flowchart is repeatedly performed from the ignition switch is on to off and while the vehicle is stopped or runs at extremely low speed (preferably, less than 10 km/h, and more preferably, less than 5 km/h). In addition, this flow chart corresponds to the construction described in Embodiment 4 (FIG. 6) that has been described before.

Firstly, in Step 1, the control unit 11 determines based on a detection signal of the gearshift position detection sensor whether or not the gear selection position of the gearshift is in the non-running stage, that is, in P, N range. If the gearshift is determined to lie in P, N range in Step 1, as shown in Step 2, the gear ratio of the toroidal type continuously variable transmission 4 is corrected to the primary correction value (the position H) corresponding to the forward direction based on the drive of the stepping motor 29. Note that as described above, the gear ratio of the toroidal type continuously variable transmission 4 can be adjusted the GN value when the gearshift is in P, N range. However, as has been described before, if the gear ratio of the toroidal type continuously variable transmission 4 is corrected in advance to the primary correction value (the position H) which corresponds to the forward direction in such a state that the gearshift is positioned in the non-running state (P, N range) before the gearshift is operated to the forward position (D, L range), when the gearshift is operated to the forward position, the driving force needed in the forward direction (the slightly strong creeping force) can be outputted in an ensured fashion and momentarily only by simply engaging the clutch. Moreover, when the gearshift is operated from the non-running state to the forward position to which the gearshift is operated highly frequently, the gear ratio of the toroidal type continuously variable transmission 4 does not have to be corrected to the primary correction value (the gear ratio only has to be maintained at the primary correction value to which the gear ratio was corrected in the non-running state, and the gear ratio can be corrected quickly from the primary correction value to the secondary correction value), and therefore, an increase in stabilization of the gear ratio correcting operation can also be realized. Due to this, in the case of the embodiment, in Step 2 above, the gear ratio of the toroidal type continuously variable transmission 4 is corrected to the position H.

On the other hand, if, in Step 1, the gearshift is determined not to be shifted in P, N range, in the following step 3, the control unit 11 determines whether or not the gearshift has just been operated. This determination is also performed based on the detection signal from the gearshift position detection sensor. In Step 3, if the gearshift is determined to have been operated just before, as shown in the following step 4, the control unit 11 determines whether or not the gear selection position of the gearshift is the forward position, that is, D, L range. If the gearshift is determined to be in D, L range in Step 4, as shown in Step 5, an optimal creeping force control is carried out. Namely, the gear ratio of the toroidal continuously variable transmission 4 is corrected from the primary correction value (the position H) corresponding to the forward direction which was corrected in the previous step 2 to the secondary correction value (the position I) by driving the stepping motor 29 according to the correlation shown in Table 1. In addition, in the event that in Step 2 above, the gear ratio of the toroidal type continuously variable transmission is adjusted (not to the position H but) to the GN value, before proceeding to Step 5, the gear ratio is corrected from the GN value to the primary correction value (the position H) corresponding to the forward direction. Then, after the gear ratio has been corrected to the primary correction value like this, the optimal creeping force control (correction to the secondary correction value) in Step 5 is carried out.

In contrast, if, in step 4, the gearshift is determined not to be shifted in D, L range, that is, the gearshift is determined to be in the R range, as shown in Step 6, the gear ratio of the toroidal type continuously variable transmission 4 is corrected to the primary correction value (the position J) corresponding to the reverse direction based on the drive of the stepping motor 29. Following this, as shown in Step 7, the optimal creeping control is carried out. Namely, the gear ratio of the toroidal type continuously variable transmission 4 is corrected from the primary correction value (the position J) corresponding to the reverse direction which was corrected in Step 6 to the secondary correction value (the position K) corresponding to the reverse direction by driving the stepping motor 29 based on the correlation shown in Table 2. Note that the correction of the gear ratio to the primary correction value (the position H or the position J) can be determined by seeing whether or not the step position of the stepping motor 29 has been driven to the position which corresponds to the primary correction value or a gear ratio calculated from rotational speeds of input side and output disks 6, 8 has become the primary correction value.

If the gear ratio of the toroidal type continuously variable transmission 4 is corrected to the secondary correction value (the position I or position) which corresponds to the traveling direction in Steps 5 and 7 in the way described above, as shown in the following step 8, a creeping force correction control is carried out. Namely, also if the gear ratio of the toroidal type continuously variable transmission 4 is determined to have been corrected to the secondary correction value which corresponds to the traveling direction due to the gearshift having already been operated, proceed to the step 8. Then, in Step 8, the gear ratio of the toroidal type continuously variable transmission 4 is corrected such that the actual driving force (creeping force) that is outputted from the output shaft 14 becomes an optimal value available then according to a differential pressure between the hydraulic chambers 26a, 26b which make up the actuator 19.

To describe specifically, while comparing the differential pressure Y (the reference differential pressure Y) corresponding to the optimal driving force to be outputted which is stored in the memory of the control unit 11 in advance to the actual differential pressure X (the current differential pressure X), the gear ratio of the toroidal type continuously variable transmission 4 is corrected. Namely, as shown in the following step 9, whether or not the actual differential pressure X is larger than the differential pressure Y corresponding to the optimal driving force is determined. In the case of the embodiment, the actual differential pressure X is compared to a value (Y+a) resulting by adding a hysteresis a that is determined by turning or the like to the differential pressure Y. Namely, in the step 9, whether or not the actual differential pressure X is larger than the value (Y+a) resulting by adding the hysteresis a to the differential pressure Y {X>(Y+a)} is determined. Note that the hysteresis a is set in advance to an optimal value obtained through experiments or the like. Then, if the actual differential pressure X is determined to be larger than the value (Y+a) in Step 9, as shown in the following step 10, the gear ratio of the toroidal type continuously variable transmission 4 is corrected in the direction in which the driving force outputted from the output shaft 14 is decreased (weakened) (by driving the stepping motor 29 by one step).

On the contrary, if the actual differential pressure X is determined to be equal to or smaller than the value (Y+a) in Step 9, as shown in the following step 11, whether or not the actual differential pressure X is smaller than the differential pressure Y which corresponds to the optimal driving force available then. In the case of the embodiment, the actual differential pressure X is compared to a value (Y+b) resulting by adding a hysteresis b (<a) that is determined by turning or the like to the differential pressure Y. Namely, in the step 11, whether or not the actual differential pressure is smaller than the value (Y+b) resulting by adding the hysteresis b (<a) {X<(Y+b)} is determined. Note that as with the hysteresis a, the hysteresis b is also set in advance to an optimal value obtained through experiments or the like. Then, if the actual differential pressure X is determined to be smaller than the value (Y+b) in Step 11, as shown in the following step 12, the gear ratio of the toroidal type continuously variable transmission 4 is corrected in the direction in which the driving force outputted from the output shaft 14 is increased (strengthened) (by driving the stepping motor 29 by one step).

In contrast, if, in Step 11, the actual differential pressure X is the value (Y+b) or larger, that is, if the actual value X is determined to substantially coincide with the differential pressure Y which corresponds to the optimal driving force {(Y+b)≦X≦(Y+a)}, the process ends without correcting the gear ratio of the toroidal type continuously variable transmission 4. Thus, by repeating the operation illustrated in the flowchart like this, the state is maintained where the optimal driving force can be outputted from the output shaft 14. Note that as has been described before, the correction carried out according to the differential pressures can be effected condition that the low-speed clutch 15 is made ready for transmission of power and the torque passing through the toroidal type continuously variable transmission 4 can be detected as the differential pressure between the hydraulic pressures 26a, 26b which make up the actuator 19.

Note that while the flowchart corresponds to the construction illustrated in Embodiment 4, the flowchart can also be used in the other embodiments in the similar way. Namely, in the case of Embodiments 1, 2, 3, 6, 7, except that the gear ratio of the toroidal type continuously variable transmission 4 is corrected to the primary correction value based on the switching of the secondary actuator 47 or the swing of the swing plate 54, the correction to the secondary correction value (the optimal creeping control in FIG. 14) and the correction based on the differential pressures (the creeping force correction control in FIG. 14) can be carried out along the flowchart. In addition, in the case of Embodiment 5, except that the stepping motor 29 is replaced by the primary switching valve 62, the individual corrections can be carried out along the flowchart.

According the embodiment that is configured as has been described above, the vehicle can be prevented from traveling in an opposite direction to one that is intended by the driver by correcting the gear ratio of the toroidal type continuously variable transmission 4 to the primary correction value (the position H or position J) before the low-speed clutch 15 is made ready for transmission of power. In addition to this, by correcting the gear ratio further from the state where it is corrected to the primary correction value to the secondary correction value (the position I or position K), the driving force outputted from the driving shaft 14 can be adjusted to a more optimal value available then (according to the state value such as oil temperature). Furthermore, by correcting the gear ratio further from the secondary correction value according to the driving force actually outputted from the output shaft 14 (the differential pressure between the hydraulic chambers 26a, 26b which make up the actuator 19), the optimal driving force can be outputted minutely and accurately. In addition, even in the event that the low-speed clutch 15 is made ready for transmission of power before the gear ratio is corrected to the secondary correction value, since the gear ratio is corrected to at least the primary correction value at which the slightly strong creeping force can be outputted or the value between the primary correction value and the secondary correction value, the vehicle can be prevented from traveling in an opposite direction to one intended by the driver in an ensured fashion.

Note that in the case of the embodiment, the correction of the gear ratio which is carried out while obtaining the driving force that is actually outputted from the output shaft 14 (the differential pressure corresponding to that driving force) is carried out after the gear ratio has been corrected to the secondary correction value (the position I or position K). However, the gear ratio correction can be effected not after the gear ratio has been corrected to the secondary correction value but after the gear ratio has been corrected to the primary correction value (the position H or position J). Namely, the gear ratio can be corrected while obtaining the driving force (the differential pressure corresponding to the driving force) after the gear ratio has been corrected to the primary correction value without carrying out the operation for correcting the gear ratio to the secondary correction value. As with Embodiments 1 to 7 where only the correction by the predetermined amount is carried out (the gear ratio is corrected to the primary correction value without correcting it to the secondary correction value), the gear ratio can, of course, be corrected while obtaining the driving force (the pressure difference corresponding to the driving force) after the gear ratio is corrected by the predetermined amount in the way described before (or is corrected to the primary correction vale).

In addition, in all the embodiments including this embodiment, when the gearshift is operated from one gear selection position to the other gear selection position of the reverse position (R range) and any of the other positions (P, N, D, L range) than the reverse position, the gear ratio of the toroidal type continuously variable transmission 4 is corrected within the range including the GN value (in such a manner as to straddle the GN value). Due to this, even in the event that the gearshift is operated to either gear selection position of the forward position and the reverse position (the traveling directions of these gear selection positions are opposite to each other), the gear ratio of the toroidal type continuously variable transmission 4 can be corrected to the value at which the driving force corresponding to the traveling direction of the gear selection position to which the gearshift is operated. Due to this, the vehicle can be prevented from traveling in an opposite direction to one intended by the driver in an ensured fashion. In addition, in the case of this embodiment, as has been described before, when the gearshift is operated to the reverse position, the gear ratio of the toroidal type continuously variable transmission 4 is corrected to the value lying on the opposite side to the primary correction value (the position H) which corresponds to the forward position across the GN value, that is, the primary correction value (the position J) which corresponds to the reverse position. Due to this, even in the event that the gearshift is operated to the reverse position, the vehicle can be prevented from traveling in an opposite direction to one intended by the driver in an ensured fashion. The invention can be applied to toroidal type continuously variable transmissions which make up continuously variable transmission systems whether the toroidal type continuously variable transmissions are of double-cavity type or single-cavity type, or of half toroidal type or full toroidal type.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A continuously variable transmission system comprising:
   a toroidal type continuously variable transmission comprising:
      at least a pair of disks supported concentrically with each other in a relatively rotatable fashion;
      a plurality of power rollers held between the pair of disks;
      a plurality of support members rotatably supporting the plurality of power rollers, respectively; and
      a hydraulic actuator displacing the support members individually so as to change a gear ratio between the pair of disks;
   a gearwheel type differential unit comprising a plurality of gearwheels which are engaged each other; and
   a clutch device which freely connects and disconnects a power transmission path of the continuously variable transmission system,
   wherein rotary states of an output shaft are freely changed between forward rotation and reverse rotation across a stationary state with an input shaft kept rotating in one direction by a drive source, such the rotary states of the output shaft are obtained by adjusting the gear ratio of the toroidal type continuously variable transmission to change a relative displacement speed of the respective gearwheels of the differential unit, and
   wherein when a gearshift is operated from a non-running state to a running state, the gear ratio of the toroidal type continuously variable transmission is corrected by a predetermined amount, before the clutch device connecting the power transmission path transmits power in accordance with an operation of the gearshift.

2. The continuously variable transmission system as set forth in claim 1, wherein
   the predetermined amount of the gear ratio of the toroidal type continuously variable transmission to be corrected is, a difference between a GN value and a target value,
   wherein the GN value is a gear ratio of the toroidal type continuously variable transmission obtained when the output shaft is stopped while the input shaft is kept rotating in one direction in such a state that no load is applied to the output shaft,
   wherein the target value is a gear ratio of the toroidal type continuously variable transmission obtained when load on the output shaft is released from a state where the load is applied to the output shaft and the toroidal type continuously variable transmission transmits a predetermined through torque in a state that the output shaft is stopped while the input shaft is kept rotating in one direction,
   wherein the predetermined through torque is set within a range of values at which a state can be realized without stopping the driving source where the output shaft is stopped with the input shaft kept rotating due to a torque shift of the toroidal type continuously variable transmission, when a large load is applied to the output shaft with the input shaft kept rotating in one direction.

3. The continuously variable transmission system as set forth either of claim 1, wherein the gear ratio of the toroidal type continuously variable transmission is corrected based on the operation of the gearshift.

4. The continuously variable transmission system as set forth in claim 1, further comprising a control unit for controlling the gear ratio of the toroidal type continuously variable transmission, the control unit comprising:
   a gear ratio control valve for switching a supply and discharge of pressure oil to and from the actuator; and
   a primary driving member for changing a switching state of the gear ratio control valve,
   wherein the control unit adjusts the gear ratio at a normal time and also corrects the gear ratio in response to the operation of the gearshift by changing the switching state of the gear ratio control valve based on an operation of the primary driving member.

5. The continuously variable transmission system as set forth in claim 1, further comprising a control unit for controlling the gear ratio of the toroidal type continuously variable transmission, the control unit comprising:
   a primary electric switching valve for directly switching the supply and discharge of pressure oil to and from the actuator
   wherein the control unit adjusts the gear ratio at a normal time and also corrects the gear ratio in response to the operation of the gearshift by changing the switching state of the primary switching valve based on an operation of the primary driving member.

6. The continuously variable transmission system as set forth in claim 1, further comprising:
   a secondary electric switching valve switching an engaged state and a disengaged state of the clutch device,
   wherein the clutch device is engaged based on the switching of the secondary switching valve in such a state that the gear ratio of the toroidal type continuously variable transmission has been corrected completely.

7. The continuously variable transmission system as set forth in claim 1, wherein the gear ratio of the toroidal type continuously variable transmission is corrected within a range including the GN value, when the gearshift is operated between a reverse position and a group of positions including any other selecting positions than the reverse position.

8. The continuously variable transmission system as set forth in claim 1, wherein the gear ratio of the toroidal type continuously variable transmission is corrected in a state that the gearshift is in the non-running state.

9. The continuously variable transmission system as set forth in claim 8, wherein the gear ratio of the toroidal type continuously variable transmission is corrected to a value which corresponds to a forward position.

10. The continuously variable transmission system as set forth in claim 9, wherein when the gearshift is operated to the forward position, the gear ratio of the toroidal type continuously variable transmission is maintained at a corrected value.

11. The continuously variable transmission system as set forth in claim 1, further comprising a control unit for controlling the gear ratio of the toroidal type continuously variable transmission, comprising:
- a gear ratio control valve for switching supply and discharge of pressure oil to and from the actuator;
- a primary driving member for changing the switching state of the gear ratio control valve; and
- a secondary driving member provided separately from the primary driving member for changing the switching state of the gear ratio control valve in response to the operation of the gearshift and
- wherein the gear ratio of the toroidal type continuously variable transmission is corrected by changing the switching state of the gear ratio control valve through a separate operation of the secondary driving member from the primary driving member.

12. The continuously variable transmission system as set forth in claim 11, wherein the secondary driving member is a secondary actuator which is operated hydraulically.

13. The continuously variable transmission system as set forth in claim 12, further comprising a tertiary switching valve, of which switching state is changed based on the operation of the gearshift, for supplying and discharging the pressure oil to the secondary hydraulic actuator.

14. The continuously variable transmission system as set forth in claim 13, wherein the tertiary switching valve is electrically operated.

15. The continuously variable transmission system as set forth in claim 11, wherein the secondary driving member is a member which is displaced based on a force with which the gearshift is operated, and
- the switching state of the gear ratio control valve is changed based on a displacement of the secondary driving member to corrects the gear ratio of the toroidal type continuously variable transmission.

16. The continuously variable transmission system as set forth in claim 11, wherein the gear ratio control valve, the primary driving member and the secondary driving member are linked together by a link arm.

17. The continuously variable transmission system as set forth in claim 11, wherein the secondary driving member is a secondary actuator which is operated electrically, and the secondary actuator is operated based on the operation of the gearshift.

18. The continuously variable transmission system as set forth in claim 1, wherein the gear ratio of the toroidal type continuously variable transmission is corrected such that:
- before the clutch device is made ready for transmission of power, correcting the gear ratio to a primary correction value by correcting the predetermined amount to be corrected; and
- correcting the gear ratio from the primary correction value to a secondary correction value whether or not the clutch device has been made ready for transmission of power.

19. The continuously variable transmission system as set forth in claim 18, wherein the primary correction value is a value which ensures the output from the output shaft of a driving force which enables a vehicle to start from a rest state and run at low speed in a direction corresponding to a position to which the gearshift is operated, and
- the secondary correction value is a value which enables the output of a driving force which is smaller than a driving force outputted in such a state that the gear ratio is corrected to the primary correction value.

20. The continuously variable transmission system as set forth in claim 18, wherein the gear ratio of the toroidal type continuously variable transmission is corrected to the primary correction value which corresponds to a forward direction in such a state that the gearshift is in the non-running state.

21. The continuously variable transmission system as set forth in claim 20, wherein the gear ratio of the toroidal type continuously variable transmission is maintained at the primary correction value which corresponds to the forward direction when the gearshift is operated to a forward position.

22. The continuously variable transmission system as set forth in claim 18, wherein the gear ratio of the toroidal type continuously variable transmission is corrected to a value lying opposite to the primary correction value corresponding to the forward position across the GN value when the gearshift is operated to the reverse position.

23. The continuously variable transmission system as set forth in claim 22, wherein the gear ratio of the toroidal type continuously variable transmission is corrected to the primary correction value corresponding to the reverse position when the gearshift is operated to the reverse position.

24. The continuously variable transmission system as set forth in claim 18, wherein the gear ratio of the toroidal type continuously variable transmission is corrected from the primary correction value to the secondary correction value based on the operation of the gearshift.

25. The continuously variable transmission system as set forth in claim 24, wherein the gear ratio of the toroidal type continuously variable transmission is corrected from the primary correction value corresponding to the forward direction to the secondary correction value on a condition where the gearshift is operated to the forward position.

26. The continuously variable transmission system as set forth in claim 24, wherein the gear ratio of the toroidal type continuously variable transmission is corrected from the primary correction value corresponding to the reverse direction to the secondary correction value on a condition that the gearshift is operated to the reverse position.

27. The continuously variable transmission system as set forth in claim 18, wherein the secondary correction value is a value which enables the output from the output shaft of an optimal driving force which is determined according to a state amount which affects a driving force to be outputted.

28. The continuously variable transmission system as set forth in claim 27, wherein the state amount is temperature of lubricating oil residing therein.

29. The continuously variable transmission system as set forth in claim 1, wherein after the gear ratio of the toroidal type continuously variable transmission has been corrected by the predetermined value, an actual driving force outputted from the output shaft is obtained,
- the gear ratio is further corrected based on the actual driving force.

30. The continuously variable transmission system as set forth in claim 29, wherein the actual driving force is obtained based on a differential pressure between a pair of oil chambers of actuators, the differential value being proportioned to a torque that passes through the toroidal type continuously variable transmission,
- wherein the gear ratio of the toroidal type continuously variable transmission is corrected according to the differential pressure of the actuator.

* * * * *